US007459209B2

(12) United States Patent
Smith et al.

(10) Patent No.: US 7,459,209 B2
(45) Date of Patent: Dec. 2, 2008

(54) COMPOSITION AND METHOD FOR MAKING A PROPPANT

(75) Inventors: Russell J. Smith, Houston, TX (US); John R. Loscutova, Houston, TX (US); Elizabeth A. Whitsitt, Houston, TX (US); Christopher E. Coker, Houston, TX (US); Andrew R. Barron, Houston, TX (US); Mark Wiesner, Houston, TX (US); Stephen A. Costantino, Reading, PA (US); Rajendra Kumar Bordia, Seattle, WA (US)

(73) Assignee: Oxane Materials, Inc., Houston, TX (US)

( * ) Notice: Subject to any disclaimer, the term of this patent is extended or adjusted under 35 U.S.C. 154(b) by 393 days.

(21) Appl. No.: 11/347,664

(22) Filed: Feb. 3, 2006

(65) Prior Publication Data

US 2006/0177661 A1   Aug. 10, 2006

Related U.S. Application Data

(60) Provisional application No. 60/649,594, filed on Feb. 4, 2005.

(51) Int. Cl.
B32B 5/16 (2006.01)
(52) U.S. Cl. .................. 428/403; 428/404; 428/405; 428/406; 427/212; 166/280.2; 507/269
(58) Field of Classification Search .................. 428/402, 428/403–406; 427/212; 166/280.2; 507/269
See application file for complete search history.

(56) References Cited

U.S. PATENT DOCUMENTS

| 3,365,315 | A | 1/1968  | Beck et al.     |
|-----------|---|---------|-----------------|
| 3,794,503 | A | 2/1974  | Netting         |
| 3,796,777 | A | 3/1974  | Netting         |
| 3,888,957 | A | 6/1975  | Netting         |
| 3,960,583 | A | 6/1976  | Netting et al.  |
| 4,111,713 | A | 9/1978  | Beck            |
| 4,303,061 | A | 12/1981 | Torobin         |
| 4,303,431 | A | 12/1981 | Torobin         |
| 4,303,432 | A | 12/1981 | Torobin         |
| 4,303,433 | A | 12/1981 | Torobin         |
| 4,303,730 | A | 12/1981 | Torobin         |
| 4,303,731 | A | 12/1981 | Torobin         |
| 4,303,732 | A | 12/1981 | Torobin         |
| 4,303,736 | A | 12/1981 | Torobin         |
| 4,349,456 | A | 9/1982  | Sowman          |
| 4,415,512 | A | 11/1983 | Torobin         |
| 4,420,442 | A | 12/1983 | Sands           |
| 4,421,562 | A | 12/1983 | Sands           |
| 4,493,875 | A | 1/1985  | Beck et al.     |
| 4,547,468 | A | 10/1985 | Jones et al.    |
| 4,632,876 | A | 12/1986 | Laird et al.    |
| 4,637,990 | A | 1/1987  | Torobin         |
| 4,639,427 | A | 1/1987  | Khaund          |
| 4,641,709 | A | 2/1987  | Powers et al.   |
| 4,654,266 | A | 3/1987  | Kachnik         |
| 4,668,645 | A | 5/1987  | Khaund          |
| 4,671,909 | A | 6/1987  | Torobin         |
| 4,680,230 | A | 7/1987  | Gibb et al.     |
| 4,698,317 | A | 10/1987 | Inoue et al.    |
| 4,725,390 | A * | 2/1988 | Laird et al. .................. 264/660 |
| 4,743,545 | A | 5/1988  | Torobin         |
| 4,744,831 | A | 5/1988  | Beck            |
| 4,764,218 | A | 8/1988  | Kobayashi et al.|
| 4,777,154 | A | 10/1988 | Torobin         |
| 4,790,688 | A | 12/1988 | Castor          |
| 4,793,980 | A | 12/1988 | Torobin         |
| 4,869,960 | A | 9/1989  | Gibb et al.     |
| 4,881,951 | A | 11/1989 | Wood et al.     |
| 4,894,285 | A | 1/1990  | Fitzgibbob      |
| 4,917,857 | A | 4/1990  | Jaeckel et al.  |
| 4,919,866 | A | 4/1990  | Kubbutat        |
| 4,921,820 | A | 5/1990  | Rumpf et al.    |
| 4,921,821 | A | 5/1990  | Rumpf et al.    |
| 4,923,714 | A | 5/1990  | Gibb et al.     |
| 4,944,905 | A | 7/1990  | Gibb et al.     |
| 4,954,462 | A | 9/1990  | Wood et al.     |

(Continued)

FOREIGN PATENT DOCUMENTS

EP   0 207 668 A1   1/1987

(Continued)

OTHER PUBLICATIONS

Cutler et al., "Lightweight Proppants For Deep Gas Well Stimulation, Final Report," submitted by Terra Tek Engineering, work performed for the Department of Energy under Contract No. DE-AC19-79BC10038, published Jan. 1984 (64 pages).

(Continued)

Primary Examiner—Leszek Kiliman
(74) Attorney, Agent, or Firm—Kilyk & Bowersox, P.L.L.C.

(57) ABSTRACT

The present invention relates to proppants which can be used to prop open subterranean formation fractions. Proppant formulations are further disclosed which use one or more proppants of the present invention. Methods to prop open subterranean formation fractions are further disclosed. In addition, other uses for the proppants of the present invention are further disclosed, as well as methods of making the proppants.

75 Claims, 5 Drawing Sheets

U.S. PATENT DOCUMENTS

| | | | |
|---|---|---|---|
| 4,964,883 A | 10/1990 | Morris et al. |
| 4,977,116 A | 12/1990 | Rumpf et al. |
| 4,983,550 A | 1/1991 | Goetz et al. |
| 5,017,523 A | 5/1991 | Kimura et al. |
| 5,071,635 A | 12/1991 | Yamanaka et al. |
| 5,120,455 A | 6/1992 | Lunghofer |
| 5,183,493 A | 2/1993 | Brandau et al. |
| 5,185,299 A | 2/1993 | Wood et al. |
| 5,188,175 A | 2/1993 | Sweet |
| 5,212,143 A | 5/1993 | Torobin |
| 5,219,806 A | 6/1993 | Wood |
| 5,225,123 A | 7/1993 | Torobin |
| 5,240,654 A | 8/1993 | Smith et al. |
| 5,240,894 A | 8/1993 | Burkhardt et al. |
| 5,282,875 A | 2/1994 | Wood et al. |
| 5,318,382 A | 6/1994 | Cahill |
| 5,322,821 A | 6/1994 | Brezny |
| 5,326,513 A | 7/1994 | Kubbutat |
| 5,352,254 A | 10/1994 | Celikkaya |
| 5,397,759 A | 3/1995 | Torobin |
| 5,420,086 A | 5/1995 | Brandau et al. |
| H1447 H | 6/1995 | Linton |
| 5,472,648 A | 12/1995 | Alisch et al. |
| 5,474,583 A | 12/1995 | Celikkaya |
| 5,489,318 A | 2/1996 | Erickson et al. |
| 5,496,386 A | 3/1996 | Broberg et al. |
| 5,516,348 A | 5/1996 | Conwell et al. |
| 5,534,348 A | 7/1996 | Miller et al. |
| 5,547,479 A | 8/1996 | Conwell et al. |
| 5,639,806 A * | 6/1997 | Johnson et al. ............. 523/208 |
| 5,645,619 A | 7/1997 | Erickson et al. |
| 5,669,941 A | 9/1997 | Peterson |
| 5,690,707 A | 11/1997 | Wood et al. |
| 5,708,039 A | 1/1998 | Daly et al. |
| 5,728,184 A | 3/1998 | Monroe |
| 5,739,368 A | 4/1998 | Krzystowczyk et al. |
| 5,750,459 A | 5/1998 | Marella et al. |
| 5,779,743 A | 7/1998 | Wood |
| 5,893,935 A | 4/1999 | Wood |
| 5,899,256 A | 5/1999 | Rohatgi |
| 5,908,478 A | 6/1999 | Wood |
| 5,921,317 A | 7/1999 | Dewprashad et al. |
| 6,048,470 A | 4/2000 | Nakahara et al. |
| 6,139,960 A | 10/2000 | Styron et al. |
| 6,197,073 B1 | 3/2001 | Kadner et al. |
| 6,206,942 B1 | 3/2001 | Wood |
| 6,210,625 B1 | 4/2001 | Matsushita et al. |
| 6,211,109 B1 | 4/2001 | Shamshoum et al. |
| 6,258,456 B1 | 7/2001 | Meyer |
| 6,322,890 B1 | 11/2001 | Barron et al. |
| 6,330,916 B1 | 12/2001 | Rickards et al. |
| 6,369,183 B1 | 4/2002 | Cook et al. |
| 6,372,678 B1 | 4/2002 | Youngman et al. |
| 6,406,789 B1 | 6/2002 | McDaniel et al. |
| 6,409,650 B2 | 6/2002 | Bruno et al. |
| 6,492,024 B1 | 12/2002 | Walter |
| 6,528,446 B1 * | 3/2003 | Stensrud ..................... 501/148 |
| 6,572,697 B2 | 6/2003 | Gleeson et al. |
| 6,582,819 B2 | 6/2003 | McDaniel et al. |
| 6,632,527 B1 | 10/2003 | McDaniel et al. |
| 6,632,528 B1 | 10/2003 | Clough |
| 6,667,261 B1 | 12/2003 | Anshits et al. |
| 6,713,177 B2 | 3/2004 | George et al. |
| 6,746,636 B2 | 6/2004 | Meyer |
| 6,772,838 B2 | 8/2004 | Dawson et al. |
| 6,780,804 B2 | 8/2004 | Webber et al. |
| 6,805,737 B2 | 10/2004 | Godeke et al. |
| 6,806,236 B2 | 10/2004 | Frenier et al. |
| 6,832,654 B2 | 12/2004 | Ravensbergen et al. |
| 6,913,827 B2 | 7/2005 | George et al. |
| 6,916,891 B2 | 7/2005 | Salem et al. |
| 6,962,200 B2 | 11/2005 | Nguyen et al. |
| 6,983,797 B2 | 1/2006 | Nguyen et al. |
| 7,032,664 B2 | 4/2006 | Lord et al. |
| 7,036,591 B2 | 5/2006 | Cannan et al. |
| 7,036,592 B2 | 5/2006 | Nguyen et al. |
| 7,066,258 B2 | 6/2006 | Justus et al. |
| 7,135,231 B1 | 11/2006 | Sinclair et al. |
| 7,160,844 B2 | 1/2007 | Urbanek |
| 7,220,454 B2 | 5/2007 | Barron et al. |
| 2002/0025436 A1 | 2/2002 | Meyer |
| 2002/0114941 A1 | 8/2002 | Franke et al. |
| 2002/0128142 A1 | 9/2002 | Godeke et al. |
| 2003/0026989 A1 | 2/2003 | George et al. |
| 2003/0148893 A1 | 8/2003 | Lunghofer et al. |
| 2003/0150185 A1 | 8/2003 | Godeke et al. |
| 2003/0167797 A1 | 9/2003 | Schmid et al. |
| 2003/0180537 A1 | 9/2003 | Meyer |
| 2003/0203205 A1 | 10/2003 | Bi et al. |
| 2003/0203207 A1 | 10/2003 | Pessey et al. |
| 2004/0012105 A1 | 1/2004 | Deppe et al. |
| 2004/0040708 A1 | 3/2004 | Stephenson et al. |
| 2004/0069490 A1 | 4/2004 | Cannan et al. |
| 2004/0079260 A1 | 4/2004 | Datta et al. |
| 2004/0080063 A1 | 4/2004 | Datta et al. |
| 2004/0081827 A1 | 4/2004 | Datta et al. |
| 2004/0105980 A1 | 6/2004 | Sudarshan et al. |
| 2004/0200617 A1 | 10/2004 | Stephenson et al. |
| 2004/0224155 A1 | 11/2004 | Barron et al. |
| 2004/0231844 A1 | 11/2004 | Nguyen et al. |
| 2004/0251573 A1 | 12/2004 | Schmid |
| 2004/0262801 A1 | 12/2004 | Hojaji et al. |
| 2004/0266933 A1 | 12/2004 | Friedman et al. |
| 2005/0006095 A1 | 1/2005 | Justus et al. |
| 2005/0016726 A1 | 1/2005 | Nguyen et al. |
| 2005/0022991 A1 | 2/2005 | Rao |
| 2005/0028979 A1 | 2/2005 | Bramon et al. |
| 2005/0061509 A1 | 3/2005 | Nguyen |
| 2005/0089631 A1 | 4/2005 | Nguyen et al. |
| 2005/0096207 A1 | 5/2005 | Urbanek |
| 2005/0194141 A1 | 9/2005 | Sinclair et al. |
| 2005/0244641 A1 | 11/2005 | Vincent |
| 2005/0272611 A1 | 12/2005 | Lord et al. |
| 2005/0284630 A1 | 12/2005 | Nguyen et al. |
| 2006/0006589 A1 | 1/2006 | Canova et al. |
| 2006/0016598 A1 | 1/2006 | Urbanek |
| 2006/0035790 A1 | 2/2006 | Okell et al. |
| 2006/0065398 A1 | 3/2006 | Brannon et al. |
| 2006/0073980 A1 | 4/2006 | Brannon et al. |
| 2006/0078682 A1 | 4/2006 | McDaniel et al. |
| 2006/0081371 A1 | 4/2006 | Duenckel et al. |
| 2006/0113080 A1 | 6/2006 | Nguyen et al. |
| 2006/0151170 A1 | 7/2006 | Brannon et al. |
| 2006/0162929 A1 | 7/2006 | Urbanek |
| 2006/0219600 A1 | 10/2006 | Palamara et al. |
| 2006/0240967 A1 | 10/2006 | Hojaji et al. |
| 2006/0258546 A1 | 11/2006 | Brannon et al. |
| 2006/0272816 A1 | 12/2006 | Willberg et al. |
| 2007/0021306 A1 | 1/2007 | Berger et al. |
| 2007/0023187 A1 | 2/2007 | Canova et al. |
| 2007/0036977 A1 | 2/2007 | Sinclair et al. |
| 2007/0054054 A1 | 3/2007 | Svoboda et al. |
| 2007/0062699 A1 | 3/2007 | Alary et al. |
| 2007/0072776 A1 | 3/2007 | Crews |
| 2007/0083331 A1 | 4/2007 | Craig |
| 2007/0084602 A1 | 4/2007 | Curimbaba et al. |
| 2007/0087941 A1 | 4/2007 | Cawiezel |
| 2007/0099793 A1 | 5/2007 | Wilson |
| 2007/0114030 A1 | 5/2007 | Todd et al. |
| 2007/0166541 A1 | 7/2007 | Smith et al. |
| 2007/0172654 A1 | 7/2007 | Leidolph et al. |
| 2007/0172655 A1 | 7/2007 | Leidolph et al. |
| 2007/0173417 A1 | 7/2007 | Kaufman et al. |
| 2007/0202318 A1 | 8/2007 | Smith et al. |

| | | |
|---|---|---|
| 2007/0204992 A1 | 9/2007 | Davis et al. |
| 2007/0209794 A1 | 9/2007 | Kaufman et al. |
| 2008/0009425 A1 | 1/2008 | Pershikova |
| 2008/0015103 A1 | 1/2008 | Luscher et al. |
| 2008/0058228 A1 | 3/2008 | Wilson |
| 2008/0070774 A1 | 3/2008 | Shmotev et al. |
| 2008/0087429 A1 | 4/2008 | Brannon et al. |

FOREIGN PATENT DOCUMENTS

| | | | |
|---|---|---|---|
| EP | 0207668 A1 | * | 1/2008 |
| WO | WO 01/66909 A2 | | 9/2001 |

OTHER PUBLICATIONS

Meyer, "Spheroidal Beads from Boiler Slag and Fly Ash," 1999 International Ash Utilization Symposium, Center for Applied Energy Research, University of Kentucky, Paper #29, 1999 (8 pages).

U.S. Appl. No. 11/769,247, filed Jun. 27, 2007, to Smith et al.

Thorsten Brandau and Egbert Brandau, "Hafnia and Hafnia—Zirconia Mixed Oxide Ultra Spherical Microspheres Made by a SOL-GEL-Vibrational Dropping Process," Feb. 26, 2005, pp. 1-7.

Thorsten Brandau, "Powders and Granules," Microspheres: Technology and Applications, Apr. 10, 2005, pp. 1-6.

Weisner et al., "Nanomaterials, Sustainability, and Risk Minimization," Introduction to IWA International Conference on Nano and Microparticles in Water and Wastewater Treatment, Sep. 2003 (11 pages).

International Search Report and Written Opinion issued Jul. 12, 2006 in PCT/US2006/004106.

Communication from the European Patent Office from corresponding European Patent Application No. 06 734 420.0 dated Feb. 11, 2008 (3 pages).

International Search Report and Written Opinion of the International Searching Authority from corresponding International Patent Application No. PCT/US2007/015624 dated Mar. 3, 2008 (16 pages).

Defriend et al., "A flexible route to high strength α-alumina and aluminate spheres," Journal of Materials Science, No. 38, 2003, pp. 2673-2678.

Wang et al., "Conversion of Fly Ash Cenosphere to Hollow Microspheres with Zeolite/Mullite Composite Shells," Advanced Functional Materials, vol. 13, No. 7, Jul. 2003, pp. 563-567.

Defriend et al., "Surface repair of porous and damaged alumina bodies using carboxylate-alumoxane nanoparticles," Journal of Materials Science, No. 37, 2002, pp. 2909-2916.

Callender et al., "Aqueous Synthesis of Water-Soluble Alumoxanes: Environmentally Benign Precursors to Alumina and Aluminum-Based Ceramics," Chem. Mater., No. 9, 1997, pp. 2418-2433.

Mauer Engineering, "Geothermal Fracture Stimulation Technology, vol. 1, Fracturing Proppants and Their Properties," work performed under Contract No. AC32-79AL10563, U.S. Dept. of Energy, Geothermal Energy, Jul. 1980 (100 pgs.).

Arp et al., "Case History Study of Fracture Height Containment in East Texas," Society of Petroleum Engineers, Document No. SPE 14653, 1986 (6 pgs.).

Jones et al., "Lightweight Proppants For Deep Gas-Well Stimulation," First Annual Report Jul. 1979-Jul. 1980, work performed for the Dept. of Energy under Contract No. DE-AC19-79BC10038, published Oct. 1981, Document No. DOE/BC/10038-19 (34 pgs.).

Cutler et al., "Lightweight Proppants for Deep Gas Well Stimulation," Second Annual Report, Jul. 1, 1980-Jun. 30, 1981, work performed for the Dept. of Energy under Contract No. DE-AC19-79BC10038, published Apr. 1982, Document No. DOE/BC/10038-22 (51 pgs.).

Cutler et al., "Lightweight Proppants For Deep-Gas-Well Stimulation," Third Annual Report, Jul. 1, 1981-Jun. 30, 1982, work performed for the Dept. of Energy under Contract No. DE-AC19-79BC10038, published Apr. 1983, Document No. DOE/BC/10038-27 (113 pgs.).

* cited by examiner

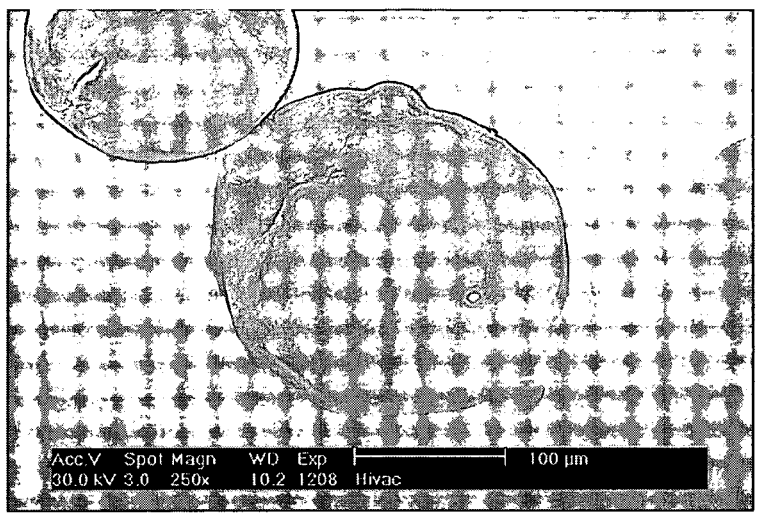
Figure 6: SEM micrograph at 250X magnification of proppant particles with sintered ceramic outer shell (to 1400°C) from Ex. 10.
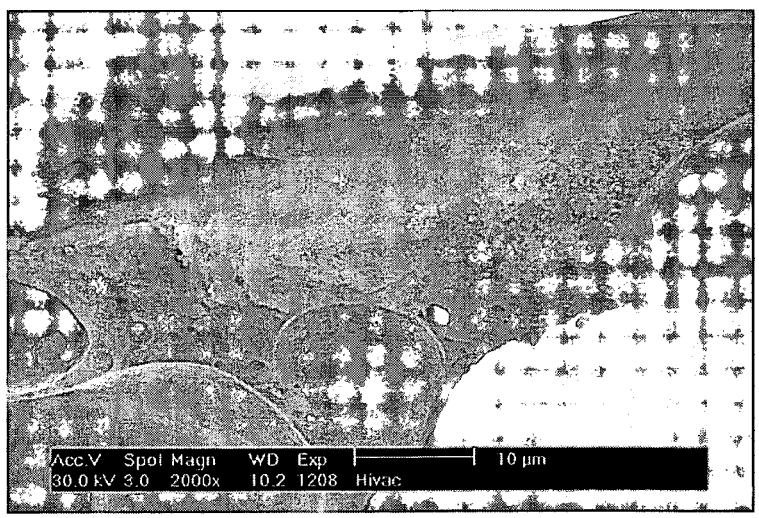
Figure 7: SEM micrograph at 2000X magnification of a fractured cross section from Ex. 10, showing sintered ceramic shell and underlying template.

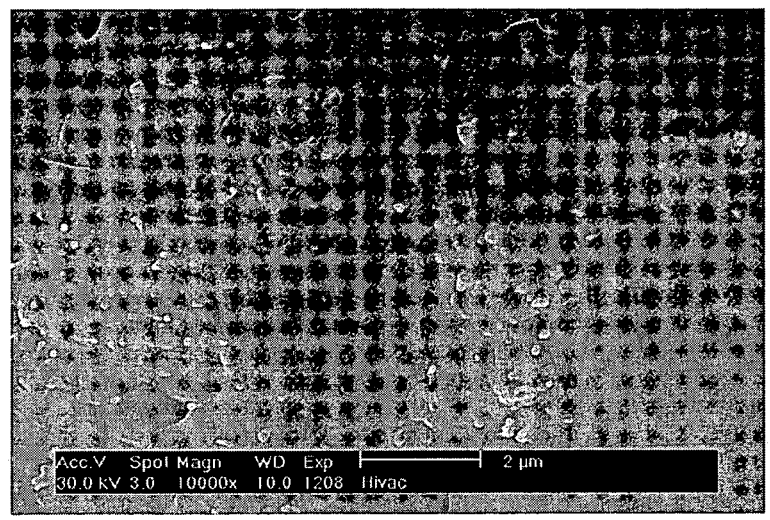
Figure 8: SEM micrograph at 10000X magnification of Ex. 10 shell microstructure, fired to 1400°C.
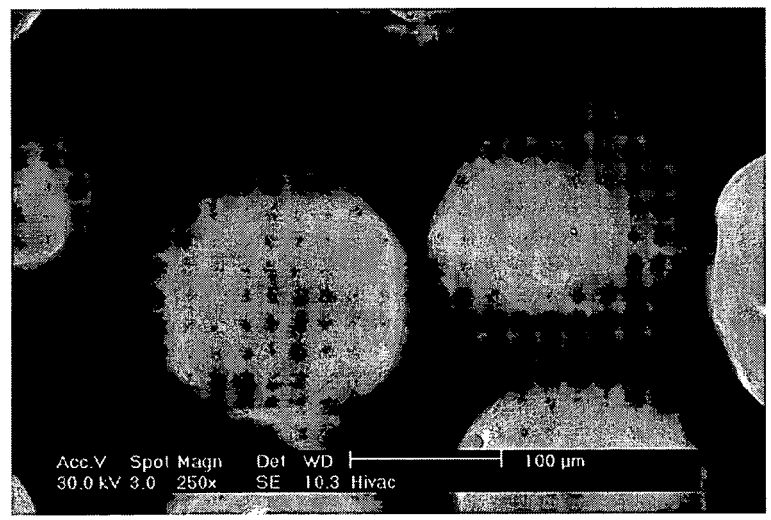
Figure 9: SEM micrograph at 250X magnification of proppant particles with sintered ceramic outer shell (to 1200°C) from Ex. 11.

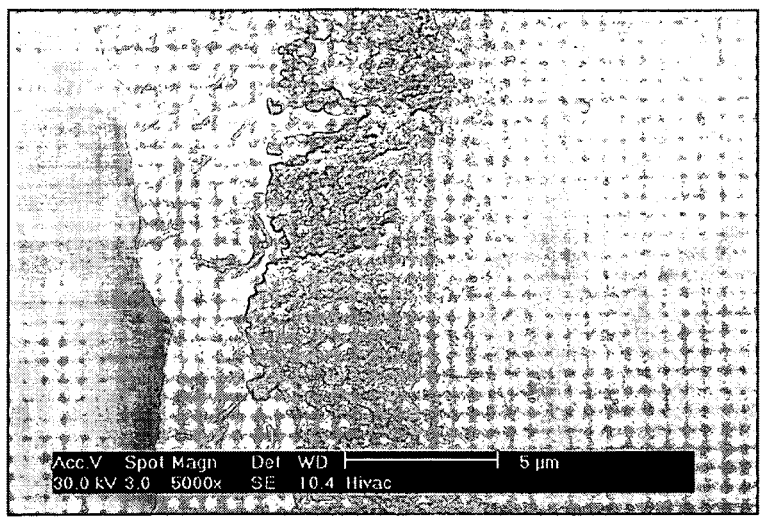
Figure 10: SEM micrograph at 5000X magnification of a fractured cross section from Ex. 11, showing sintered ceramic shell and underlying template. The ceramic shell has a uniform submicron grain size.
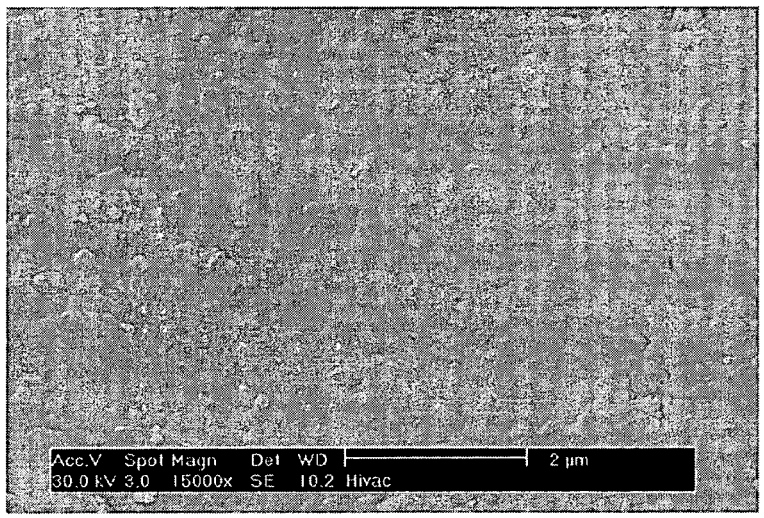
Figure 11: SEM micrograph at 15000X magnification of Ex. 11 shell microstructure, fired to 1200°C.

COMPOSITION AND METHOD FOR MAKING A PROPPANT

This application claims the benefit under 35 U.S.C. §119 (e) of prior U.S. Provisional Patent Application No. 60/649,594 filed Feb. 4, 2005, which is incorporated in its entirety by reference herein.

BACKGROUND OF THE INVENTION

Recognition that the macroscopic properties of materials depend not only on their chemical composition, but also on the size, shape and structure has spawned investigations into the control of these parameters for various materials. In this regard, the fabrication of uniform hollow spheres has recently gained much interest. Hollow capsules with nanometer and micrometer dimensions offer a diverse range of potential applications, including utilization as encapsulants for the controlled release of a variety of substances, such as drugs, dyes, proteins, and cosmetics. When used as fillers for coatings, composites, insulating materials or pigments, hollow spheres provide advantages over the traditional solid particles because of their associated low densities. Hollow spheres may also be used in applications as diverse as hierarchical filtration membranes and proppants to prop open fractures in subterranean formations.

Ceramic proppants are widely used as propping agents to maintain permeability in oil and gas formations. Conventional proppants offered for sale exhibit exceptional crush strength but also extreme density. Typical densities of ceramic proppants exceed 100 pounds per cubic foot. Proppants are materials pumped into oil or gas wells at extreme pressure in a carrier solution (typically brine) during the fracturing process. Once the pumping-induced pressure is removed, proppants "prop" open fractures in the rock formation and thus preclude the fracture from closing. As a result, the amount of formation surface area exposed to the well bore is increased, enhancing recovery rates. Proppants also add mechanical strength to the formation and thus help maintain flow rates over time. Three grades of proppants are typically employed: sand, resin-coated sand and ceramic proppants. Proppants are principally used in gas wells, but do find application in oil wells.

Relevant quality parameters include: particle density (low density is desirable), crush strength and hardness, particle size (value depends on formation type), particle size distribution (tight distributions are desirable), particle shape (spherical shape is desired), pore size distribution (tight distributions are desirable), surface smoothness, corrosion resistance, temperature stability, and hydrophilicity (hydro-neutral to phobic is desired).

Ceramic proppants dominate sand and resin-coated sand on the critical dimensions of crush strength and hardness. They offer some benefit in terms of maximum achievable particle size, corrosion and temperature capability. Extensive theoretical modeling and practical case experience suggest that conventional ceramic proppants offer compelling benefits relative to sand or resin-coated sand for most formations. Ceramic-driven flow rate and recovery improvements of 20% or more relative to conventional sand solutions are not uncommon.

Ceramic proppants were initially developed for use in deep wells (e.g., those deeper than 7,500 feet) where sand's crush strength is inadequate. In an attempt to expand their addressable market, ceramic proppant manufacturers have introduced products focused on wells of intermediate depth.

Resin-coated sands offer a number of advantages relative to conventional sands. First, resin coated sands exhibit higher crush strength than uncoated sand given that resin-coating disperses load stresses over a wider area. Second, resin-coated sands are "tacky" and thus exhibit reduced "proppant flow-back" relative to conventional sand proppants (e.g. the proppant stays in the formation better). Third, resin coatings typically increase sphericity and roundness thereby reducing flow resistance through the proppant pack.

Ceramics are typically employed in wells of intermediate to deep depth. Shallow wells typically employ sand or no proppant. As will be described in later sections, shallow "water fracs'" represent a potential market roughly equivalent to the current ceramic market in terms of ceramic market size.

With a combined annual production of over 30 million tons, the oxides and hydroxides of aluminum are undoubtedly among the most industrially important chemicals (K. Wefers and C. Misra, "Oxides and Hydroxides of Aluminum." Alcoa Laboratories, 1987). Their uses include: precursors for the production of aluminum metal, catalysts and absorbents; structural ceramic materials; reinforcing agents for plastics and rubbers, antacids and binders for the pharmaceutical industry; and as low dielectric loss insulators in the electronics industry. With such a diverse range of applications, it is unsurprising that much research has been focused on developing and understanding methods for the preparation of these materials.

Traditional ceramic processing involves three basic steps generally referred to as powder processing, shape forming, and densification, often with a final mechanical finishing step. Although several steps may be energy intensive, the most direct environmental impact arises from the shape-forming process where various binders, solvents, and other potentially toxic agents are added to form and stabilize a solid ("green") body. In addition to any innate health risk associated with the chemical processing, these agents are subsequently removed in gaseous form by direct evaporation or pyrolysis. In many cast-parts, the liquid solvent alone consists of over 50% of the initial volume of material. The component chemicals listed, with relative per percentage, in Table 1 are essentially mixed to a slurry, cast, then dried and fired. All solvents and additives must be removed as gaseous products via evaporation or pyrolysis.

TABLE 1

Composition of a non aqueous tape-casting alumina slurry

| Function | Composition | Volume % |
|---|---|---|
| Powder | Alumina | 27 |
| Solvent | 1,1,1-Trichloroethylene/Ethyl Alcohol | 58 |
| Deflocculent | Menhaden Oil | 1.8 |
| Binder | Polyvinyl Butyrol | 4.4 |
| Plasticizer | Polyethylene Glycol/Octyl Phthalate | 8.8 |

Whereas the traditional sintering process is used primarily for the manufacture of dense parts, the solution-gelation process has been applied industrially primarily for the production of porous materials and coatings. Solution-gelation involves a four-stage process: dispersion; gelation; drying; firing. A stable liquid dispersion or sol of the colloidal ceramic precursor is initially formed in a solvent with appropriate additives. By change in concentration (aging) or pH, the dispersion is polymerized to form a solid dispersion or gel. The excess liquid is removed from this gel by drying and the final ceramic is formed by firing the gel at higher temperatures.

The common solution-gelation route to aluminum oxides employs aluminum hydroxide or hydroxide-based material as the solid colloid, the second phase being water and/or an organic solvent. Aluminum hydroxide gels have traditionally been prepared by the neutralization of a concentrated aluminum salt solution; however, the strong interactions of the freshly precipitated alumina gels with ions from the precursors solutions makes it difficult to prepare these gels in pure form. To avoid this complication alumina gels may be prepared from the hydrolysis of aluminum alkoxides, $Al(OR)_3$ (Eq. 1).

(1)

Although this method was originally reported by Adkins in 1922 (A. Adkins, J. Am. Chem. Soc. 1922, 44, 2175), it was not until the 1970's when it was shown that transparent ceramic bodies can be obtained by the pyrolysis of suitable alumina gels, that interest increased significantly (B. E. Yoldas, J. Mat. Sci. 1975, 10, 1856).

The exact composition of the gel in commercial systems is ordinarily proprietary, however, a typical composition can include an aluminum compound, a mineral acid and a complexing agent to inhibit premature precipitation of the gel, e.g., Table 2. The aluminum compound was traditionally assumed to be the direct precursor to pseudo-boehmite. However, the gel is now known to consist of aluminum-oxygen macromolecular species with a boehmite-like core: alumoxanes.

TABLE 2

Typical composition of an alumina sol-gel for slipcast filter membranes

| Function | Composition |
|---|---|
| Boehmite Precursor | ASB [aluminum sec-butoxide, $Al(OC_4H_9)_3$] |
| Electrolyte | $HNO_3$ 0.07 mole/mole ASB |
| Complexing agent | glycerol ca. 10 wt. % |

The replacement of 1,1,1-trichloroethylene (TCE) as a solvent in the traditional ceramic process must be regarded as a high priority for limiting environmental pollution. Due to its wide spread use as a solvent in industrial processes, TCE has become one of the most commonly found contaminants in ground waters and surface waters. Concentrations range from parts per billion to hundreds of milligrams per liter. The United States Environmental Protection Agency (USEPA) included TCE on its 1991 list of 17 high-priority toxic chemicals targeted for source reduction. The 1988 releases of TCE reported under the voluntary right to know provisions of Superfund Amendments and Reauthorization Act (SARA) totaled to 190.5 million pounds.

The plasticizers, binders, and alcohols used in the process present a number of potential environmental impacts associated with the release of combustion products during firing of the ceramics, and the need to recycle or discharge alcohols which, in the case of discharge to waterways, may exert high biological oxygen demands in the receiving communities.

Ceramic ultrafiltration (UF) and nanofiltration (NF) membranes have been fabricated by the sol-gel process in which a thin membrane film is deposited, typically by a slip-cast procedure, on an underlying porous support. This is typically achieved by hydrolysis of Al, Ti, Zr or other metal compounds to form a gelatinous hydroxide at a slightly elevated temperature and high pH. In the case of alumina membranes, this first step may be carried out with 2-butanol or iso-propanol. After removing the alcohol, the precipitated material is acidified, typically using nitric acid, to produce a colloidal suspension. By controlling the extent of aggregation in the colloidal sol, membranes of variable permeability may be produced. The aggregation of colloidal particles in the sol is controlled by adjusting the solution chemistry to influence the diffuse layer interactions between particles or through ultrasonification. Alternatively, a sol gel can be employed, which is then applied to a porous support. While this procedure offers greater control over membrane pore size than does the metal precipitation route, it is nonetheless a difficult process to manipulate. In both cases, plasticizers and binders are added to improve the properties of the slip cast solution. Once the film has been applied it is dried to prevent cracking and then sintered at high temperature.

The principal environmental results arising from the sol-gel process are those associated with use of strong acids, plasticizers, binders, and solvents. Depending on the firing conditions, variable amounts of organic materials such as binders and plasticizers may be released as combustion products. NOx's may also be produced from residual nitric acid in the off-gas. Moreover, acids and solvents must be recycled or disposed of. Energy consumption in the process entails "upstream" environmental emissions associated with the production of that energy.

The aluminum-based sol-gels formed during the hydrolysis of aluminum compounds belong to a general class of compounds: alumoxanes. Alumoxanes were first reported in 1958 and have since been prepared with a wide variety of substituents on aluminum. The structure of alumoxanes was proposed to consist of linear (I) or cyclic (II) chains (S. Pasynkiewicz, Polyhedron, 1990, 9, 429). Recent work has redefined the structural view of alumoxanes, and shown that they are not chains but three dimensional cage compounds (A. W. Apblett, A. C. Warren, and A. R. Barron, Chem. Mater., 1992, 4, 167; C. C. Landry, J. A. Davis, A. W. Apblett, and A. R. Barron, J. Mater. Chem., 1993, 3, 597). For example, siloxy-alumoxanes, $[Al(O)(OH)x(OSiR3)1-x]n$, consist of an aluminum-oxygen core structure (III) analogous to that found in the mineral boehmite, $[Al(O)(OH)]n$, with a siloxide substituted periphery.

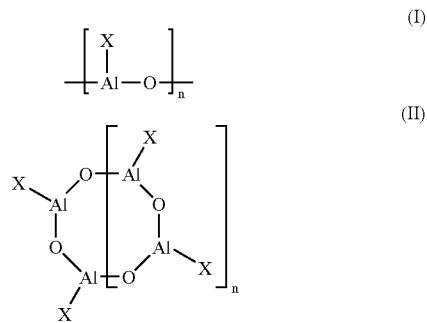

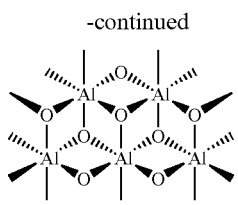

(III)

Precursor sol-gels are traditionally prepared via the hydrolysis of aluminum compounds (Eq. 1). This "bottom-up" approach of reacting small inorganic molecules to form oligomeric and polymeric materials has met with varied success, due to the difficulties in controlling the reaction conditions, and therefore the stoichiometries, solubility, and processability, of the resulting gel. It would thus be desirable to prepare alumoxanes in a one-pot bench-top synthesis from readily available, and commercially viable, starting materials, which would provide control over the products.

In the siloxy-alumoxanes, the "organic" unit itself contains aluminum, i.e., IV. Thus, in order to prepare the siloxy-alumoxane similar to those previously reported the anionic moiety, the "ligand" $[Al(OH)_2(OSiR_3)_2]^-$, would be used as a bridging group; adding this unit would clearly present a significant synthetic challenge. However, the carboxylate-alumoxanes represent a more realistic synthetic target since the carboxylate anion, $[RCO_2]^-$, is an isoelectronic and structural analog of the organic periphery found in siloxy-alumoxanes (IV and V). Based upon this rational, a "top-down" approach has been developed based upon the reaction of boehmite, $[Al(O)(OH)]n$, with carboxylic acids, Eq. 2 (Landry, C. C.; Pappé, N.; Mason, M. R.; Apblett, A. W.; Tyler, A. N.; MacInnes, A. N.; Barron, A. R., J. Mater. Chem. 1995, 5, 331).

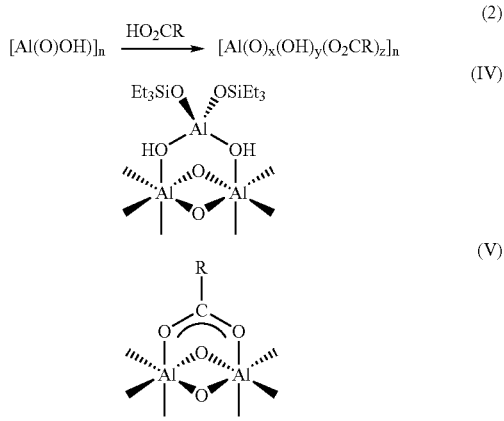

The carboxylate-alumoxane materials prepared from the reaction of boehmite and carboxylic acids are air and water stable materials and are very processable. The soluble carboxylate-alumoxanes can be dip-coated, spin coated, and spray-coated onto various substrates. The physical properties of the alumoxanes are highly dependent on the identity of the alkyl substituents, R, and range from insoluble crystalline powders to powders that readily form solutions or gels in hydrocarbon solvents and/or water. The alumoxanes are indefinitely stable under ambient conditions, and are adaptable to a wide range of processing techniques. Given the advantages observed for the application of carboxylate alumoxanes, e.g., the low price of boehmite ($1 kg$^{-1}$) and the availability of an almost infinite range of carboxylic acids make these species ideal as precursors for ternary and doped aluminum oxides. The alumoxanes can be easily converted to $\gamma$-$Al_2O_3$ upon mild thermolysis (A. W. Apblett, C. C. Landry, M. R. Mason, and A. R. Barron, Mat. Res. Soc., Symp. Proc., 1992, 249, 75).

SUMMARY OF THE INVENTION

A feature of the present invention is to provide a proppant having suitable crush strength and/or buoyancy as shown by specific gravity.

A further invention of the present invention is to provide a proppant that can overcome one or more of the disadvantages described above.

The present invention relates to a proppant comprising a template material and a shell on the template material, wherein the shell comprises a ceramic material or oxide thereof or a metal oxide. The template material can be a hollow sphere and can be a single particle, such as a cenosphere.

The present invention further relates to a proppant having a surface that comprises a ceramic material or oxide thereof or a metal oxide, wherein the surface has an average grain size of 1 micron or less. Other average grain sizes are possible. The surface can have a maximum grain size, as well as a tight distribution with respect to the grain sizes.

The present invention further relates to a method to prop open subterranean formation fractions using one or more proppants, which are preferably contained in proppant formulations.

The present invention further relates to methods of making the various proppants of the present invention. For instance, one method includes coating a template material with a formulation comprising a ceramic material or oxide thereof or a metal oxide to form a shell around the template and then hardening the shell, such as by sintering or calcining. Other methods are further described.

It is to be understood that both the foregoing general description and the following detailed description are exemplary and explanatory only and are intended to provide a further explanation of the present invention, as claimed.

The accompanying figures, which are incorporated in and constitute a part of this application, illustrate various embodiments of the present invention and, together with the description, serve to explain the principles of the present invention.

BRIEF DESCRIPTION OF DRAWINGS

FIGS. 6-11 are SEM microphotographs of several embodiments of the present invention.

DETAILED DESCRIPTION OF THE PRESENT INVENTION

Figure 1:
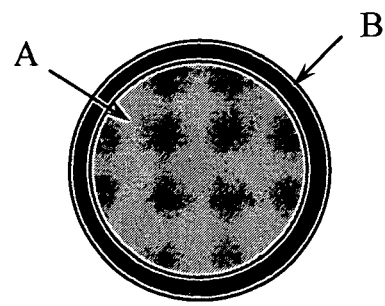
FIG. 1 is a schematic showing an embodiment of a proppant of the present invention showing a substrate (A) with the coating (B). The substrate (A) may be chosen from a group including, but not limited to, ceramic, natural material, shell, nut, or other materials. The coating (B) can be chosen from a group including, but not limited to, ceramic, ceramic precursor, polymer, resin, or a nanoparticle reinforced polymer or a nanoparticle reinforced resin.
Figure 2:
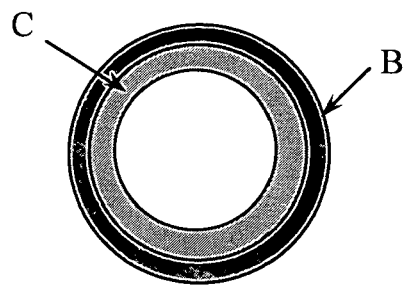
FIG. 2 shows a schematic of a proppant of the present invention showing a hollow substrate (C) with the coating (B). The substrate (C) may be chosen from a group including, but not limited to, ceramic, natural material, shell, nut, or other described in the claims. The coating (B) can be chosen from a group including, but not limited to, ceramic, ceramic precursor, polymer, resin, or a nanoparticle reinforced polymer or a nanoparticle reinforced resin.
Figure 3:
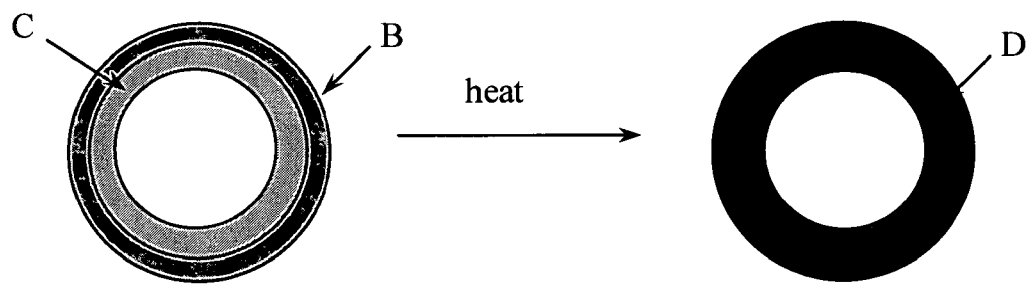
FIG. 3 shows a schematic of the reaction or conversion of the coating (B) and substrate (A) to form a mixed phase or new phase material (D).

The materials of the present invention when used as proppants could dominate current proppant solutions on all relevant quality dimensions. The methods of this invention are aimed at the fabrication of proppants that preferably exhibit neutral buoyancy, high crush strength, high sphericity, narrow size distribution, and/or high smoothness. These materials have the ability to materially reduce and/or possibly eliminate the need to employ expensive and reservoir permeability-destroying polymer carrier gels.

Equally important, the optimal shape, size, size distribution, pore size distribution, and/or surface smoothness properties of the present invention suggest that flow resistance through the proppant pack could be reduced, such as by more than 50%. Neutral buoyancy enhances proppant transport deep into the formation increasing the amount of fracture-area propped thereby increasing the mechanical strength of the reservoir. Due to the above issues, proppants of the present invention can achieve substantially increased flow rates and/or enhanced hydrocarbon recovery. The low-cost of the present invention's preferred nanoparticles, and the reduced material requirements (on a per pound basis) are advantages of the present invention's preferred proppants. The low density of the present invention's proppants may enable reductions in transportation costs in certain situations.

The proppants of the present invention present oil and gas producers with one or more of the following benefits: improved flow rates, improved productive life of wells, improved ability to design hydraulic fractures, and/or reduced environmental impact. The proppants of the present invention are designed to improve flow rates, eliminating or materially reducing the use of permeability destroying polymer gels, and/or reducing pressure drop through the proppant pack, and/or the ability to reduce the amount of water trapped between proppants thereby increasing hydrocarbon "flow area."

The high density of conventional ceramic proppants and sands (roughly 100 lb/cu.ft.) inhibit their transport inside fractures. High density causes proppants to "settle out" when pumped thereby minimizing their efficacy. To maintain dense proppants in solution, expensive polymer gels are typically mixed with the carrier solution (e.g. completion fluid). Once suspended in a gelled completion fluid, proppant transport is considerably enhanced.

Polymer gels are extremely difficult to de-cross link, however. As a result, the gel becomes trapped downhole, coats the fracture, and thereby reduces reservoir permeability. Gel-related reservoir permeability "damage factors" can range from 40% to more than 80% depending on formation type.

The neutral buoyancy property that can be exhibited by the proppants of the present invention preferably eliminates or greatly reduces the need to employ permeability destroying polymer gels as they naturally stay in suspension.

Equally important, the shape and surface properties of the proppants of the present invention preferably reduce the pressure drop through the proppant pack. As a result, flow rates should increase. Theoretical modeling of the non-linear non-darcy flow effects (reduced beta factor) associated with the proppants of the present invention show that this benefit could be significant—perhaps more than a 50% reduction in proppant pack flow resistance. Key details include improved sphericity and roundness, improved surface smoothness, and/or near-monodisperse size distribution.

In one or more embodiments, the proppants of the present invention are designed to improve reservoir flow rates by changing the hydrophilic properties of the proppants themselves. The hydrophilic nature of current proppants causes water to be trapped in the pore spaces between proppants. If this water could be removed, flow rates would be increased.

The use of extreme pressure, polymer gels, and/or exotic completion fluids to place ceramic proppants into formations adversely impacts the mechanical strength of the reservoir and shortens its economic life. Proppants of the present invention preferably enable the use of simpler completion fluids and possibly less (or slower) destructive pumping. Thus, reservoirs packed with neutrally buoyant proppants preferably exhibit improved mechanical strength/permeability and thus increased economic life.

More importantly, enhanced proppant transport enabled by neutral buoyancy preferably enable the placement of the proppant of the present invention in areas that were heretofore impossible, or at least very difficult to prop. As a result, the mechanical strength of the formation is preferably improved, preferably reducing decline rates over time. This benefit could be of significant importance—especially within "water fracs" where the ability to place proppants is extremely limited.

If neutrally buoyant proppants are employed, water (fresh to heavy brines) may be used in place of more exotic completion fluids. The use of simpler completion fluids would reduce or eliminate the need to employ de-crossing linking agents. Further, increased use of environmentally friendly proppants may reduce the need to employ other environmentally damaging completion techniques such as flashing formations with hydrochloric acid.

In addition to fresh water, salt water and brines, or synthetic fluids are sometimes used in placing proppants to the desired locations. These are of particular importance for deep wells.

In the present invention a range of approaches for the synthesis and fabrication of proppants with designed buoyancy are disclosed. The proppants are designed such that the material properties are such that the proppant preferably has neutral, positive, or negative buoyancy in the medium chosen for pumping the proppant to its desired location in the subterranean formation.

In the present invention, the proppant can be either solid throughout or hollow within the proppant to control buoyancy. In the present invention, a solid proppant is defined as an object that does not contain a void space in the center, although a porous material would be suitable. A fully dense material is not a requirement of solid. A hollow material is defined as a object that has a void space inside with a defined size and shape.

In the present invention the proppant can be made from a ceramic, a polymer, or mixture thereof. The proppant can be made from nanoparticles. The proppant can be a composite or combination of ceramic, polymer and other materials. Although not required it is understood that a ceramic may include oxides such as aluminum oxides (alumina) or mixed metal aluminum oxides (aluminates).

The strength properties for a proppant can be dependent on the application. It is intended that a crush strength of 4000 psi or higher is desirable. However, for specific applications, crush-strengths of greater than 9000 psi or greater than 12000 psi are desirable. Other crush strengths below or above these ranges are possible.

The optimum size of the proppant can also be dependent on the particular application. Part of the present invention is that it is possible to design various proppant sizes. Sizes (e.g., particle diameters) may vary from 10 μm to 10,000 μm. The particle diameter can be in the range of from 50 μm to 2,000 μm.

Although the proppant can be made from a single-phase material or can be made from a multi-phase system, such as from a two phase system that comprises a substrate (or template) and a second phase. A summary of exemplary templates and substrates is shown in Table 3.

The substrate or template may be an inorganic material such as a ceramic or glass. Specifically, the ceramic can be an oxide such as aluminum oxides (alumina) as well as mixed metal aluminum oxides such as metal aluminates containing calcium, yttrium, titanium, lanthanum, barium, and/or silicon in addition to aluminum. In order to make variable buoyant proppants, it is preferable to use a ceramic cenosphere or similar glass-like hollow sphere as the substrate or template.

Alternatively, the substrate may be a polymer or organic molecule or surfactant. Although not limited as such, the polymer may be chosen from polystyrene, latex, polybutadiene, polyethylene, polypropylene and chemically related polymers. The polymer can be a naturally occurring material such as a peptide or protein.

Alternatively, the substrate can be a naturally occurring material chosen from plant or tree material, such as plant seeds, crushed nuts, whole nuts, plant pips, cells, coffee grinds, or food products.

In a two-phase system, the second phase can coat the supporting or template first phase, or infiltrates the supporting or template first phase, or reacts with the supporting or template first phase.

The second phase can be a polymer, such as an epoxide, polyolefin, or polymethacrylate. Furthermore, a nanopartcle material such as an alumoxane optionally containing chemical functional groups that allow for reaction with the polymer can reinforce the polymer. Suitable chemical functional groups or substituents include, but are not limited to, hydroxides, amines, carboxylates or olefins.

The second phase can also be a ceramic or glass. The ceramic can be an oxide, such as aluminum oxide called alumina, or a mixed metal oxide of aluminum called an aluminate, a silicate, or an aluminosilicate, such as mullite or cordierite. The aluminate or ceramic may contain magnesium, calcium, yttrium, titanium, lanthanum, barium, and/or silicon. The ceramic may be formed from a nanoparticle precursor such as an alumoxane. Alumoxanes can be chemically functionalized aluminum oxide nanoparticles with surface groups including those derived from carboxylic acids such as acetate, methoxyacetate, methoxyethoxyacetate, methoxyethoxyethoxyacetate, lysine, and stearate, and the like.

The designed proppant can be suspended in a liquid phase. The liquid phase may make the proppant more easy to transport to a drill site. Transportation may be by rail transport, road or ship, or any other appropriate method, depending on geography and economic conditions. In addition to transport to the drill site, the suspended mixture is preferably pumpable or otherwise transportable down the well to a subterranean formation and placed such as to allow the flow of hydrocarbons out of the formation.

Specific methods for designing proppants with specific buoyancy, strength, size, and/or other desirable properties are summarized below.

A proppant particle with controlled buoyancy and crush strength used to prop open subterranean formation fractures can be made from a naturally occurring substrate coated with an organic polymer or resin coating preferably containing a nanoparticle reinforcement. The naturally occurring substrate can be chosen from the following group: crushed nut shells, plant seeds, coffee grinds, plant pips, or other food products. The organic polymer or resin can be chosen from the following group: epoxide resin, polyethylene, polystyrene, or polyaramide. The nanoparticle reinforcement can be of various types, but is preferably a carboxylate alumoxane in which the carboxylate alumoxane optionally has one or more types of chemical functional groups that can react or otherwise interact with the polymer resin and/or also allow for the alumoxane to be miscible with the polymer. Proppants of this design may be made by suspending a substrate material in a suitable solvent, adding the polymer, resin or resin components, adding the nanoparticle, allowing the resin and nanoparticle mixture to coat the substrate material, and drying the coated particle. The nanoparticle and resin components can be pre-mixed before addition to the substrate, and a solvent or other components can be a component of the resin or polymer.

A proppant particle with controlled buoyancy and crush strength used to prop open subterranean formation fractures can be made from a ceramic substrate and an organic polymer or resin coating. The ceramic substrate or template can be a non-porous or porous particle and can be a solid or hollow particle. It is preferable that the particle is a hollow spherical particle such as a cenosphere or similar product. Cenospheres can be commercially produced ceramic or glass hollow spheres that are made as side products in various industrial processes. The organic polymer or resin can be chosen from the following group: epoxide resin, polyethylene, polystyrene, or polyaramide. Proppants of this design may be made by suspending a substrate material in a suitable solvent, adding the polymer, resin or resin components, allowing the resin to coat the substrate material, and drying the coated particle. It is possible to use a solvent to facilitate the coating process. An improved version of this proppant can be prepared by the addition of nanoparticles for reinforcement, such as an alumoxane optionally with chemical functional groups that react and/or allow miscibility with the polymer resin. An alternative method of controlling the properties of the proppant is to add a linker group to the surface of the ceramic substrate that can react with the organic polymer or resin coating.

A proppant particle with controlled buoyancy and/or crush strength used to prop open subterranean formation fractures can be made from a ceramic substrate, a ceramic coating, or infiltration. The ceramic substrate or template is preferably spherical and hollow such as a cenosphere or similar material. However, any suitable substrate that provides the resulting properties of the proppant may be used. The ceramic coating or infiltration can be an oxide, for instance, an oxide of aluminum or a mixed metal oxide of aluminum. A proppant of this type may be prepared by coating of a spherical template with a ceramic precursor solution, drying the coated ceramic particle, and heating the coated ceramic particle to a temperature sufficient to form ceramic sphere of desired porosity and hardness. The ceramic precursor may be a nanoparticle such as an alumoxane, or a sol-gel precursor. Proppants of this type may be prepared by suspending the ceramic substrate in a suitable solvent, adding a ceramic precursor, allowing the ceramic precursor to coat the ceramic substrate, drying the coated ceramic particle, and heating the coated ceramic particle to a temperature sufficient to form ceramic spheres of desired porosity and hardness.

TABLE 3

Possible Templates for proppants

| Food and food products | Plants and minerals | Waste | Other |
|---|---|---|---|
| Coffee, Milk, Whey, Animal/Fish Eggs, Nuts, Small corn pieces. Wood flour, Grain Husks (corn, maize, mailo, capher, sorgum). | Soils, Bauxite, Cellulose, Guargum, Algae, Lignin, Poppy Seeds, Mustard Seeds Rape Seeds Plankton Pieces of sponge Fur/Hair, Kohl Rabi Seeds | Slag (steel, coke) Silicas (diatomaceous earth, diatomite, kesselgur, Popped Perlite, Vermiculate), Fly ash (coke), Rust, Gypsum (fertilizer), Rubber (tires), Spent FCC catalyst, Spent Motor Oil Used adsorbents Flue gas filter cakes from bags in baghouses cenospheres | a) Polypropylene, b) Glass Beads c) Surfactants/ Detergents d) Polystyrene e) Bacteria f) Erasers g) Soap Sawdust h) macrolite |

In the present invention, in one or more embodiments, the invention relates to a proppant used to prop open subterranean formation fractions comprising a particle or particles with controlled buoyancy and/or crush strength. The controlled buoyancy can be a negative buoyancy, a neutral buoyancy, or a positive buoyancy in the medium chosen for pumping the proppant to its desired location in the subterranean formation. The medium chosen for pumping the proppant can be any desired medium capable of transporting the proppant to its desired location including, but not limited to a gas and/or liquid, like aqueous solutions, such as water, brine solutions, and/or synthetic solutions. Any of the proppants of the present invention can have a crush strength sufficient for serving as a proppant to prop open subterranean formation fractures. For instance, the crush strength can be 3,000 psi or greater, greater than 4000 psi, greater than 9000 psi, or greater than 12000 psi. Suitable crush strength ranges can be from about 3000 psi to about 15000 psi, or from about 5000 psi to about 15000 psi, and the like.

The proppants of the present invention can comprise a single particle or multiple particles and can be a solid, partially hollow, or completely hollow in the interior of the particle. The particle can be spherical, nearly spherical, oblong in shape (or any combination thereof) or have other shapes suitable for purposes of being a proppant.

The proppant can have any particle size. For instance, the proppant can have a particle diameter size of from about 1 nm to 1 cm or a diameter in the range of from about 1 micron to about 1 mm, or a diameter of from about 10 microns to about 10000 microns, or a diameter of from about 1000 microns to about 2000 microns. Other particle sizes can be used. Further, the particle sizes as measured by their diameter can be above the numerical ranges provided herein or below the numerical ranges provided herein.

In one or more embodiments of the present invention, the particle comprising the proppant can be or can contain a ceramic material. The ceramic material can comprise an oxide such as an oxide of aluminum. The ceramic material can comprise an aluminate. For instance, the aluminate can be an aluminate of calcium, yttrium, titanium, lanthanum, barium, silicon, any combinations thereof, and other elements that can form aluminates.

In the present invention, the particle(s) forming the proppant can comprise a substrate or template and a second phase, such as a coating on the substrate or template. The substrate or template can be a polymer or surfactant or ceramic material. The polymer, for instance, can be any thermoplastic or thermoset polymer, or naturally occurring polymer. For instance, the polymer can be a polystyrene, a latex, or polyalkylene, such as a polyethylene or polypropylene. The polymer can be a polybutadiene, or related polymers or derivatives of any of these polymers. The polymer can be a naturally occurring material or can contain a naturally occurring material. For instance, the naturally occurring material can be a peptide or protein, or both.

With respect to the substrate or template, the substrate or template can be a naturally occurring material or can contain a naturally occurring material. For instance, the naturally occurring material can be a plant material or tree material. For instance, the naturally occurring material can be a plant seed, a crushed nut, whole nut, plant pip, cell, coffee grind, or food products, or any combination thereof. The ceramic material can comprise a cenosphere.

The second phase or coating, or shell can coat the template or substrate. The second phase or template can infiltrate the template or substrate. Further, or in the alternative, the second phase or shell or coating can react with the substrate or template, or a portion thereof.

The second phase, coating, or shell, can comprise one or more polymers such as a thermoplastic or thermoset polymer(s). Examples include, but are not limited to, an oxide, polyolefin, polymethacrylate, and the like. The coating, shell, or second phase can optionally be reinforced by nanoparticles. The nanoparticle material can be any type of material capable of acting as a reinforcement material. Examples include, but are not limited to, ceramics, oxides, and the like. Specific examples include, but are not limited to, alumoxane. The alumoxane can optionally contain one or more chemical functional groups that are on the alumoxane. These chemical functional groups can permit, facilitate, or otherwise permit reaction with a polymer that also forms the coating or shell, or the polymer that may be present in the template or substrate. Examples of substituents that may be on the nanoparticles, such as the alumoxane, include, but are not limited to, hydroxides, amines, carboxylates, olefins, and/or other reactive groups, such as alkyl groups, aromatic groups, and the like.

The coating or shell or second phase can be or contain a ceramic material(s), such as an oxide(s). Specific examples include, but are not limited to, an oxide(s) of aluminum. The ceramic can be an aluminate or alumina. For instance, the aluminate can be an aluminate of calcium, yttrium, titanium, lanthanum, barium, silicon, or any combination thereof, or can contain other elements. The material forming the coating or shell can be initially in the form of a nanoparticle such as an alumoxane. The alumoxane can be acetate, methoxyacetate, methoxyethoxyacetate, methoxyethoxyethoxyacetate, lysine, stearate, or any combination thereof.

In one or more embodiments of the present invention, the proppant can be suspended in a suitable liquid phase. The liquid phase is generally one that permits transport to a location for use, such as a well site or subterranean formation. For instance, the subterranean formation can be one where proppants are used to improve or contribute to the flow of hydrocarbons, natural gas, or other raw materials out of the subterranean formation. In another embodiment of the present invention, the present invention relates to a well site or subterranean formation containing one or more proppants of the present invention.

In one embodiment of the present invention, the proppant which preferably has controlled buoyancy and/or crush strength has a naturally occurring substrate or template with an organic polymer or resin coating on the template or substrate and wherein the organic polymer or resin coating contains nanoparticles, preferably for reinforcement purposes. As specific examples, but non-limiting examples, the naturally occurring substrate can be a crushed nut, cell, plant seed, coffee grind, plant tip, or food product. The organic polymer or resin coating, for instance, can be an epoxy resin, polyethylene, polystyrene, or polyaramide, or other thermoplastic or thermoset polymers. The nanoparticle can be an alumoxane, such as an carboxylate alumoxane or other ceramic material. The alumoxane can have one or more chemical functional groups that are capable of reacting with the organic polymer or resin coating. The functional groups can optionally allow the ceramic materials, such as alumoxane, to be miscible with the polymer or resin coating. The crush strength of this proppant can be as described earlier. The proppant can have a diameter as described earlier or can be a diameter in the size range of from about 25 to about 2000 microns. Other diameter size ranges are possible.

In the present invention, the template or substrate can be a ceramic material with an organic polymer or resin coating. The ceramic substrate can be a porous particle, substantially non-porous particle, or a non-porous particle. The ceramic template or substrate can be spherical. The ceramic substrate can be a hollow particle. For instance, the ceramic substrate can be a cenosphere. The organic polymer or resin coating can be as described above. The crush strength can be the same as described above. The diameter can be the same as described earlier. Optionally, the proppant can have nanoparticles for reinforcement value or other reasons. The nanoparticle can be in the polymer or resin coating. The nanoparticle can be the same as described earlier.

In another embodiment, the proppant can have a substrate or template containing or made from one or more ceramic material(s). A linker group can be located on the template or substrate. A shell or coating containing a polymer containing a resin coating can be located around this template or substrate having the linker group. More than one type of linker group can be used. The linker group, in at least one embodiment, permits bonding between the substrate or template and the coating. The linker group can be a coupling agent. The coupling agent can be of the type used with metal oxides.

In another embodiment, the proppant can have a substrate or template that comprises a ceramic material and further has a coating or shell that comprises a ceramic material that can be the same or different from the template material. The template or substrate and the shell or coating can have the same characteristics and parameters as described above for the other embodiments, such as shape, crush strength, buoyancy, and the like. Preferably, the ceramic substrate or template is a cenosphere and the ceramic coating or shell is an oxide, such as an oxide of aluminum or aluminate, a silicate, or an aluminosilicate. Other examples include, but are not limited to, shells that contain silicon, yttrium, magnesium, titanium, calcium, or any combinations thereof.

The proppants of the present invention can be made a number of ways. For instance, the substrate material can be suspended in a suitable solvent and then the material forming the shell or coating can be added to the solvent containing the suspended substrate material. Optionally, nanoparticles can be added. The coating material, such as the polymer or resin, as well as the nanoparticle(s) present as a mixture can then coat the substrate material. Afterwards, the coated particle is dried using conventional drying techniques such as an oven or the like. The optional presence of nanoparticles can optional react with the coating material, such as the polymer or resin. Furthermore, if nanoparticles are used, the nanoparticles can be added separately or can be pre-mixed with the coating components, such as the resin or polymer, prior to being introduced to the suspension of substrate material. The solvent that is used to suspend the substrate material can be part of or present with the polymer or resin coating materials. Furthermore, the coating materials can optionally cross link during the coating process to perform a cross-linked coating on the substrate or template.

As another option, if a linkage molecule or material is used, the linkage molecule can be reacted with the substrate or template prior to being suspended in a solvent, or after the substrate material is suspended in a solvent. The linkage molecule optionally reacts with the substrate or template material and optionally reacts with the coating or shell material such as the resin or polymer. Again, nanoparticles can be added at any point of this process.

In another method of making one or more types of proppants of the present invention, a template or substrate material can be coated, such as with a precursor solution such as a ceramic containing precursor solution. The coated template material can then be dried and subsequently heated to a temperature to form a densified shell, for instance, having desirable porosity or hardness, or both. Preferably, the material is in the shape of a sphere. In this embodiment, the precursor solution preferably comprises nanoparticles such as ceramic nanoparticles. For instance, ceramic particles can be alumoxane. The precursor solution can be in the form of a sol-gel. For instance, the sol-gel can contain aluminum as well as other elements. The template or substrate can be a hollow particle and/or can be spherical in shape. The coating that coats the ceramic template can optionally react with the substrate, for instance, during the heating step.

In another embodiment of the present invention, the proppant can be obtained by suspending a substrate, such as a ceramic substrate in a suitable solvent such as water or other aqueous solutions. The ceramic precursor which coats the template or substrate can be added. The ceramic precursor then coats the substrate or template and then the coated particle such as the coated ceramic particle can then be dried and subjected to heating to a temperature to form a densified material having desirable porosity and/or hardness. The types of materials, characteristics, and parameters of the starting materials and finished coated particles as described above apply equally here in their entirety.

In a more preferred embodiment, a solid or hollow alumina, aluminosilicate, or metal aluminate ceramic sphere is obtained by coating a spherical template with an alumoxane solution or metal doped alumoxane and then subsequent application of heat to convert this sphere to alumina, aluminosilicate, or a metal aluminate. The alumoxane can comprise acetate-alumoxane. The spherical template preferably has a diameter in the size range of from about 25 to 2000 microns. The solid or hollow spherical templates can be ceramic or can be polystyrene or other polymeric materials. Even more preferably, the templates are cenospheres or synthetically produced microspheres such as those produced from a blowing process or a drop tower process. In one embodiment, the solid or hollow spherical templates remain in tact during the conversion process to alumina, aluminosilicate, or metal aluminate. In one or more embodiments, the solid or hollow spherical templates pyrolize, decompose, or are otherwise removed during the conversion process to alumina, aluminosilicate, or metal aluminate. The wall thickness can be of any desirable thickness. For instance, the wall thickness can be in a range of from about 25 to about 2000 microns. As an option, the surface of the formed alumina, aluminosilicate, or metal aluminate sphere can be functionalized with a chemical moiety or chemical material, such as an organic ligand, like a surfactant, and can provide surface wetting properties which can assist in allowing additional ceramic precursor, which is the same or different from the earlier coating, to be applied. Then, additional heat conversion can occur to form the second or multiple coating or shell on the already coated particle.

In another embodiment, the solid or spherical templates can be first coated with a resin or polymer and cured and then an alumoxane precursor or other similar type of precursor can be subsequently coated onto the particle followed by heat conversion to form a sphere comprised of an outer alumina, aluminosilicate, or metal aluminate shell or similar type of metal containing coating. This resin coating or polymer coating can pyrolize, decompose, or otherwise be removed during the conversion process. The coating used to coat the particles such as a solution of alumoxane nanoparticles can contain, for instance, from about 0.5 to about 20% alumoxane by weight of the coating solution. Other weights are possible and permissible. The coating of the particles can occur such as by dipped coating, pan, Muller mixing, or fluid bed coating.

With respect to the polymers or resins that can be used to coat the particles, these polymers include, but are not limited to, epoxies, polyurethanes, phenols, ureas, melamine formaldehyde, furans, synthetic rubber, natural rubber, polyester resins, and the like.

The proppants of the present invention while preferably used to prop open subterranean formation fractions, can be used in other technologies, such as an additive for cement or an additive for polymers, or other materials that harden, or would benefit. The proppants of the present invention can also be used as encapsulated delivery systems for drugs, chemicals, and the like.

In another method of making the proppants of the present invention, a colloidal suspension containing polymeric beads can be suspended in any solution such as an aqueous solution of a nanostructured coating material. The beads can then be covered with a nanostructured coated material to create a ceramic. The beads can then be dried and subsequently heated to a first temperature which is sufficient to convert the nanostructured coating material to a ceramic coating, such as a densified coating. The temperature is preferably not sufficient to decompose the polymeric beads. Then, the polymeric beads can be dissolved, such as in a solvent, and extracted from the ceramic coating. Afterwards, the material can then be heated to a second temperature to form a hollow ceramic sphere of the desired porosity and/or strength. The nanostructure coating material can be as described above earlier, such as titania, alumina, chromium, molybdenum, yttrium, zirconium, or the like, or any combination thereof. The nanostructure coating material dispersed in the solution can be achieved using a sol-gel method, controlled flow cavitation, PVD-CVD, flame, plasma, high energy ball milling, or mechanomade milling processes. The nanostructure coating media can be a solution, such as alcohol, liquid hydrocarbon, or combinations thereof.

In the present invention, the strength of the particle can be controlled by varying the wall thickness, the evenness of the wall thickness, the type of nanoparticles used, or any combination thereof. Further, the size of the particle can be controlled by varying the type, size, or any combination thereof of the template used. The template can have a size of from about 1 nm to about 3000 microns.

In the present invention, in one or more embodiments, the template material can be selected from wax, surfactant-derived liquid beads, seeds, shells, nuts, grain husks, grains, soils, powdered, ground, or crushed agglomerates of wood products, powdered, ground, or crushed agglomerates of ceramic material, powdered, ground, crushed, or rolled organics, silicas (glass beads), whey, cellulose, fly ash, animal eggs, rust, soap, bacteria, algae, and rubber.

More particular examples or seeds are rape seed, a poppy seed, a mustard seed, a kohl rabbi seed, a pea seed, a pepper seed, a pumpkin seed, an oil seed, a watermelon seed, an apple seed, a banana seed, an orange seed, a tomato seed, a pear seed, a corn seed.

More particular examples of shells are walnut shell, peanut shell, pasticcio shell, or an acorn shell. More specific examples of grain husks include, corn, maize, mailo, capher, or sorgum. Another way to coat a particle in the present invention, can be with spray drying, rolling, casting, thermolysis, and the like.

Examples of powdered agglomerates of organic material include powdered milk, animal waste, unprocessed polymeric resins, animal hair, plant material, and the like. Examples of animal eggs include, but are not limited to, fish, chicken, snake, lizard, bird eggs, and the like. Examples of cellulose templates include, but are not limited to algae, flower, plankton, ground cellulose such as saw dust, hay, or other grasses, and the like. In general, the material coated can have a size of from about 100 to about 10,000 microns.

While the various embodiments of the present invention have been described in considerable detail, the following provides additional details regarding various embodiments of the present invention. It is noted that the above disclosure of the proppants, methods of making, and uses applies equally to the following disclosure of various embodiments of the present invention. Equally so, the following disclosure also applies to the above embodiments of the present invention. These disclosures are not exclusive of each other.

In one or more embodiments of the present invention, the present invention relates to a proppant comprising a template material and a shell on the template material. The shell can comprise a ceramic material or oxide thereof or a metal oxide. The shell can contain one or more types of ceramic material, or oxides thereof, or metal oxides, or any combinations thereof. The metal oxide can be a mixed metal oxide or a combination of metal oxides.

The template material can be porous, non-porous, or substantially non-porous. For purposes of the present invention, a substantially non-porous material is a material that is preferably at least 80% non-porous in its entirety, more preferably, at least 90% non-porous. The template material can be a hollow sphere or it can be a closed foam network, and/or can be a non-composite material. A non-composite material, for purposes of the present invention is a material that is not a collection of particles which are bound together by some binder or other adhesive mechanism. The template material of the present invention can be a single particle. In other words, the present invention can relate to a plurality of proppants, wherein each proppant can consists of a single particle. In one or more embodiments of the present invention, the template material can be a cenosphere or a synthetic microsphere such as one produced from a blowing process or a drop tower process.

Though optional, the template material can have a crush strength of 5000 psi or less, 3000 psi or less, or 1000 psi or less. In the alternative, the template material can have a high crush strength such as 3000 psi or more, such as from about 5000 psi to 10,000 psi. For purposes of the present invention, crush strength is determined according to API Practice 60 (2$^{nd}$ Ed. December 1995). In one or more embodiments of the present invention, the template material having a low crush strength can be used to provide a means for a coating to be applied in order to form a shell wherein the shell can contribute a majority, if not a high majority, of the crush strength of the overall proppant.

The template material can optionally have voids and these voids can be strictly on the surface of the template material or strictly in the interior of the template material or in both locations. As describe earlier, the shell can be sintered which can form a densified material which preferably has high crush strength. For instance, the shell can comprise sintered nanoparticles. These nanoparticles can be quite small, such as on the order of 0.1 nm up to 150 nm or higher with respect to primary particle size. The nanoparticles can comprise primary particles alone, agglomerates alone, or a combination of primary particles and agglomerates. For instance, the primary particles can have an average particle size of from about 1 nm to about 150 nm and the agglomerates can have an average particle size of from about 10 nm to about 350 mm. The weight ratio of primary particles to agglomerates can be 1:9 to 9:1 or any ratio in between. Other particle size ranges above and below these ranges can be used for purposes of the present invention. The shell of the proppant can have an average grain size of about 10 microns or less. The shell of the present invention can have an average grain size of 1 micron or less. The shell of the proppant of the present invention can have an average grain size of from 0.1 micron to 0.5 micron. In any of these embodiments, the maximum grain size can be 1 micron. It is to be understood that maximum size refers to the highest grain size existing with respect to measured grain sizes. With respect to any of these embodiments, as an option, at least 90% of all grain sizes can be within the range of 0.1 to 0.6 micron.

With respect to the shell, the shell can further comprise additional components used to contribute one or more properties to the shell or proppant. For instance, the shell can further comprise at least one sintering aid, glassy phase formation agent, grain growth inhibitor, ceramic strengthening agent, crystallization control agent, and/or phase formation control agent, or any combination thereof. It is to be understood that more than one of any one of these components can be present and any combination can be present. For instance, two or more sintering aids can be present, and so on. There is no limit to the combination of various agents or the number of different agents used. Generally, one or more of these additional agents or aids can include the presence of yttrium, zirconium, iron, magnesium, alumina, bismuth, lanthanum, silicon, calcium, cerium, one or more silicates, one or more borates, or one or more oxides thereof, or any combination thereof. These particular aids or agents are known to those skilled in the art. For instance, a sintering aid will assist in permitting uniform and consistent sintering of the ceramic material or oxide. A glassy phase formation agent, such as a silicate, generally enhances sintering by forming a viscous liquid phase upon heating in the sintering process. A grain growth inhibitor will assist in controlling the overall size of the grain. A ceramic strengthening agent will provide the ability to strengthen the overall crush strength of the shell. A crystallization control agent will assist in achieving the desired crystalline phase of the shell upon heat treatment such as sintering or calcining. For instance, a crystallization control agent can assist in ensuring that a desirable phase is formed such as an alpha aluminum oxide. A phase formation control agent is the same or similar to a crystallization control agent, but can also include assisting in achieving one or more amorphous phases (in addition to crystalline phases), or combinations thereof. The various aids and/or agents can be present in any amount effective to achieve the purposes described above. For instance, the aid and/or agents can be present in an amount of from about 0.1% to about 5% by weight of the overall weight of the shell. The shell(s) can comprise one or more crystalline phases or one or more glassy phases or combinations thereof.

The template material can be a synthetic ceramic microsphere such as one produced from a blowing process or a drop tower process or can be a cenosphere such as a hollow cenosphere. The template material can be a fly ash particle or particles and can be a particle or particles derived from fly ash. In more general terms, the template material can be a hollow spherical particle. The template material can be a precipitator fly ash. The template material can be a blown hollow sphere. In other words, the hollow sphere can be naturally occurring or synthetic or can be a combination.

In one or more embodiments of the present invention, the shell can be substantially non-porous. For instance, substantially non-porous means that at least 90% of the surface of the shell is non-porous.

The shell can be substantially uniform in thickness around the entire outer surface of the template material. For instance, the thickness of the shell can be substantially uniform in thickness by not varying in thickness by more than 20% or more preferably by not varying more than 10% in overall thickness around the entire circumference of the shell. The shell can be non-continuous or continuous. Continuous, for purposes of the present invention means that the shell entirely encapsulates or covers the template material within the shell. Preferably, the shell fully-encapsulates the template material.

With respect to the shell and the interaction of the shell and the template material, the shell can essentially be a physical coating on the template material and not react with the template material. Alternatively, the shell can react with one or more portions of the template material such as by chemically bonding to the template material. This chemical bonding may be ionic or covalent or both. As an alternative, the shell or portion thereof can diffuse, infiltrate, and/or impregnate at least a portion of the template material. As another alternative, the shell or at least a portion thereof can adsorb or absorb onto the template material or a portion thereof.

With respect to the outer surface of the template material and the shell, the shell can be in direct contact with the outer surface of the template material. Alternatively, one or more intermediate layers can be present in between the outer surface of the template material and the inner surface of the shell. The intermediate layer or layers can be of any material, such as a polymer, resin, ceramic material, oxide material, or the like.

The proppants of the present application can, for instance, have a specific gravity of from about 0.6 g/cc to about 2.5 g/cc. The specific gravity can be from about 1.0 g/cc to about 1.3 g/cc or can be from abut 0.9 g/cc to about 1.5 g/cc. Other specific gravities above and below these ranges can be obtained.

The proppant can have any of the crush strengths mentioned above, such as 3000 psi or greater, 5000 psi to 10,000 psi, 10,000 psi to 15,000 psi, as well as crush strengths above and below these ranges.

The shell of the proppant can have a wall thickness of any amount, such as 5 microns to about 150 microns or about 15 microns to about 120 microns. This wall thickness can be the combined wall thickness for two or more shell coatings forming the shell or can be the wall thickness for one shell coating.

As stated, the proppant can be spherical, oblong, nearly spherical, or any other shapes. For instance, the proppant can be spherical and have a sphericity of at least 0.7, at least 0.8, or at least 0.9. The term "spherical" can refer to roundness and sphericity on the Krumbein and Sloss Chart by visually grading 10 to 20 randomly selected particles.

In one or more embodiments of the present invention, the proppant can be a spray-coated shell. The shell(s) of the proppants can be formulated by one coating or multiple coatings. More than one shell can be present in layered constructions. The coatings can be the same or different from each other.

In one or more embodiments of the present invention, the shell can comprise at least alumina, aluminosilicate, aluminate, or silicate. For instance, the alumina, aluminate, or silicate can contain calcium, yttrium, magnesium, titanium, lanthanum, barium, and/or silicon, or any combination thereof. One or more rare earth metals or oxides thereof can be present.

The template material can be from a naturally occurring material as described earlier. The naturally occurring material can be seed, plant products, food products, and the like. Specific examples have been described earlier.

The proppants of the present invention, for instance, can be made by coating a template material with a formulation comprising a ceramic material or oxide thereof or metal oxide to form a shell around the template and then this formulation can be sintered to create the sintered shell having a densified structure. The shell preferably has a microcrystalline structure. The sintering can occur at any temperature to achieve densification of the ceramic material or oxide thereof of metal oxide such as from about 800° C. to about 1700° C. Generally, sintering occurs by ramping up to the temperature. The sintering temperature is the temperature in the oven or sintering device. As stated, the coating of the template material can be achieved by spray coating. For instance, in creating the shell, a non-alpha aluminum oxide can be coated onto a template material and then upon sintering, form an alpha-aluminum oxide coating. The formulation can be in the form of a slurry comprising the ceramic material or oxide thereof or metal oxide along with a carrier such as a liquid carrier. When spray coating, a spray coating chamber can be used such as a spray coater from Vector Corporation, Model MLF.01. The formulation can be introduced as an atomized spray and the template material is suspended in air within the chamber during the coating of the template material. Ranges for key parameters for the spray coating process include: Air temperature: 40°-90° C., Airflow: 90-150 liters per minute, Nozzle Air Setting: 10-25 psi. After coating, the sintering can occur.

With respect to the sintering, it is preferred that the sintering is sufficient to densify the ceramic material or oxide thereof or metal oxide so as to form a continuous coating. The formulation can comprise at least one acid, surfactant, suspension aid, sintering aid, grain growth inhibitor, glassy phase formation agent, ceramic strengthening agent, crystallization control agent, and/or phase formation control agent, or any combination thereof. One or more of these agents can be present. Again, as stated above, more than one type of the same agent can be used such as more than one type of acid, more than one type of surfactant, more than one type of sintering agent, and so on. The amount of these agents can be any amount sufficient to accomplish the desired purposes such as from about 0.1% to about 5% by weight of the weight of the final shell.

As stated above, the present invention further relates to a proppant formulation comprising one or more proppants of the present invention with a carrier. The carrier can be a liquid or gas or both. The carrier can be water, brine, hydrocarbons, oil, crude oil, gel, foam, or any combination thereof. The weight ratio of carrier to proppant can be from 10,000:1 to 1:10,000 or any ratio in between, and preferably 0.001 lb proppant/gallon fluid to 10 lb proppant/gallon fluid.

In a more preferred example, the proppant can have the following characteristics:
 (a) an overall diameter of from about 90 microns to about 1,600 microns;
 (b) spherical;
 (c) said shell is substantially non-porous;
 (d) said proppant has a crush strength of about 3,000 psi or greater;
 (e) said coating has a wall thickness of from about 15 to about 120 microns;
 (f) said proppant has a specific gravity of from about 0.9 to about 1.5 g/cc; and
 (g) said template material is a hollow sphere.

Preferably, in this embodiment, the template material is a cenosphere or an aluminate, or a sintered aluminum oxide. The template material preferably has a crush strength of less than 3000 psi or less than 1000 psi. The shell is preferably an alpha aluminum oxide coating.

For the proppants of the present invention, the shell can comprise Mullite, Cordierite, or both. In one embodiment of the present invention, the formulation that is applied onto the template material can be prepared by peptizing Boehmite or other ceramic or oxide materials with at least one acid (e.g., acetic acid) to form a sol-gel formulation comprising alumoxane. The formulation can be a slurry comprising alumoxane along with a carrier such as a liquid carrier. The slurry can contain one or more sintering aids, grain growth inhibitors, ceramic strengthening agents, glassy phase formation agents, crystallization control agents, and/or phase formation control agents, which can comprise yttrium, zirconium, iron, magnesium, alumina, bismuth, silicon, lanthanum, calcium, cerium, silicates, and/or borates, or oxides thereof, or any combination thereof.

As an additional embodiment, the present invention can comprise a surface that comprises a ceramic material or an oxide thereof or metal oxide wherein the surface (e.g., polycrystalline surface) has an average grain size of 1 micron or less. The average grain size can be about 0.5 micron or less. The average grain size can be from about 0.1 micron to about 0.5 micron. The surface having this desirable grain size can be part of a coating, shell, or can be the core of a proppant or can be a proppant solid particle or hollow particle. The surface can have a maximum grain size of 5 microns or less, such as 1 micron. Further, the surface can have grain sizes such that at least 90% of all grain sizes are within the range of from about 0.1 to about 0.6 micron. The proppant can have a crush strength of 3000 psi or greater or can have any of the crush strengths discussed above, such as 5000 psi or more or 10,000 psi or more, including from about 5000 psi to about 15,000 psi. The ceramic material in this proppant can further contain yttrium, zirconium, iron, magnesium, alumina, bismuth, lanthanum, silicon, calcium, cerium, silicates, and/or borates, or oxides thereof or any combination thereof. The proppants can contain one or more of sintering aid, glassy phase formation agent, grain growth inhibitor, ceramic strengthening agent, crystallization control agent, or phase formation control agent, or any combination thereof. The proppant formulation can contain the proppant along with a carrier such as a liquid carrier or a gas carrier.

With respect to this embodiment, a template material is optional. The proppant can be completely solid, partially hollow, or completely hollow, such as a hollow sphere. If a template material is present, any one of the template materials identified above can be used.

In all embodiments of the present invention, one or more proppants of the present invention can be used alone or in a formulation to prop open subterranean formation fractions by introducing the proppant formulation into the subterranean formation such as by pumping or other introduction means known to those skilled in the art. An example of a well completion operation using a treating fluid containing proppants or particles is gravel packing. In gravel packing operations, particles referred to in the art as gravel are carried to a subterranean producing zone in which a gravel pack is to be placed by a hydrocarbon or water carrying fluid. That is, the particles are suspended in the carrier fluid which can be viscosified and the carrier fluid is pumped into the subterranean producing zone in which a gravel pack is to be placed. Once the particles are placed in the zone, the treating fluid leaks off into the subterranean zone and/or is returned to the surface. The gravel pack produced functions as a filter to separate formation solids from produced fluids while permitting the produced fluids to flow into and through the well bore. An example of a production stimulation treatment utilizing a treating fluid having particles suspended therein is hydraulic fracturing. That is, a treating fluid, referred to in the art as a fracturing fluid, is pumped through a well bore into a subterranean zone to be stimulated at a rate and pressure such that fractures are formed and extended into the subterranean zone. At least a portion of the fracturing fluid carries particles, referred to in the art as proppant particles into the formed fractures. The particles are deposited in the fractures and the fracturing fluid leaks off into the subterranean zone and/or is returned to the surface. The particles function to prevent the formed fractures from closing whereby conductive channels are formed through which produced fluids can flow to the well bore.

While the term proppant has been used to identify the preferred use of the materials of the present invention, it is to be understood that the materials of the present invention can be used in other applications, such as medical applications, filtration, polymeric applications, catalysts, rubber applications, filler applications, drug delivery, pharmaceutical applications, and the like.

U.S. Pat. Nos. 4,547,468; 6,632,527 B1; 4,493,875; 5,212,143; 4,777,154; 4,637,990; 4,671,909; 5,397,759; 5,225,123; 4,743,545; 4,415,512; 4,303,432; 4,303,433; 4,303,431; 4,303,730; and 4,303,736 relating to the use of proppants, conventional components, formulations, and the like can be used with the proppants of the present invention, and are incorporated in their entirety by reference herein. The processes described in AMERICAN CERAMIC SOCIETY BULLETIN, Vol. 85, No. 1, January 2006, and U.S. Pat. Nos. 6,528,446; 4,725,390; 6,197,073; 5,472,648; 5,420,086; and 5,183,493, and U.S. Patent Application Publication No. 2004/0012105 can be used herein and is incorporated in its entirety herein. The proppant can be a synthetic proppant, like a synthetic cenosphere template, with any shell.

Sol-gel routes to forming monoliths or films, such as thicker than about 1 micron, can suffer from severe cracking or warping during the drying or gel consolidation process. Low solids-weight loadings result in large volumetric shrinkage during the drying process. Furthermore, cracking can be the result of relief of differential capillary stresses across the dimensions of the gel or film as drying and shrinkage occur. Total capillary stress present in the film can be a function of particle size, and decreases as particle size increases. As a result, films or monoliths formed from larger particle sizes can have a decreased tendency to incur cracking stresses during the shrinkage and drying process.

In a peptized formulation, such as a boehmite gel formulation, a blending of boehmite particles of varying dispersed size (e.g., 90% large, aggregated crystallites and 10% small, single crystallites) results in a lower number density of pores, as well as larger size of pore in the corresponding dried gel, thereby reducing drying stress. Thus, tailoring the particle size and blend of primary particles in the sol-gel formulation can confer control over crack formation for a given drying process. The particles have varying dispersed sizes in the sol-gel stage, but examination of the microstructure of the dried gel fragments reveals that only crystallites are distinct from one another in the green packing. This shows that the small particles uniformly fill the interstices of the larger particles, resulting in a well-structured green film.

The present invention will be further clarified by the following examples, which are intended to be exemplary of the present invention.

EXAMPLES

An aqueous acetate-alumoxane solution was prepared according to the method described in Chem. Mater. 9 (1997) 2418 by R. L. Callender, C. J. Harlan, N. M. Shapiro, C. D. Jones, D. L. Callahan, M. R. Wiesner, R. Cook, and A. R. Barron, incorporated in its entirety by reference herein. The aqueous solution was degassed before use. The aqueous acetate-alumoxane solution mentioned above, in the solution range of 0.5-20 weight percent, was degassed before use. Cenosphere templates in the size range of 100-600 micron were coated with the alumoxane solutions as described in the examples below.

Figure 4:
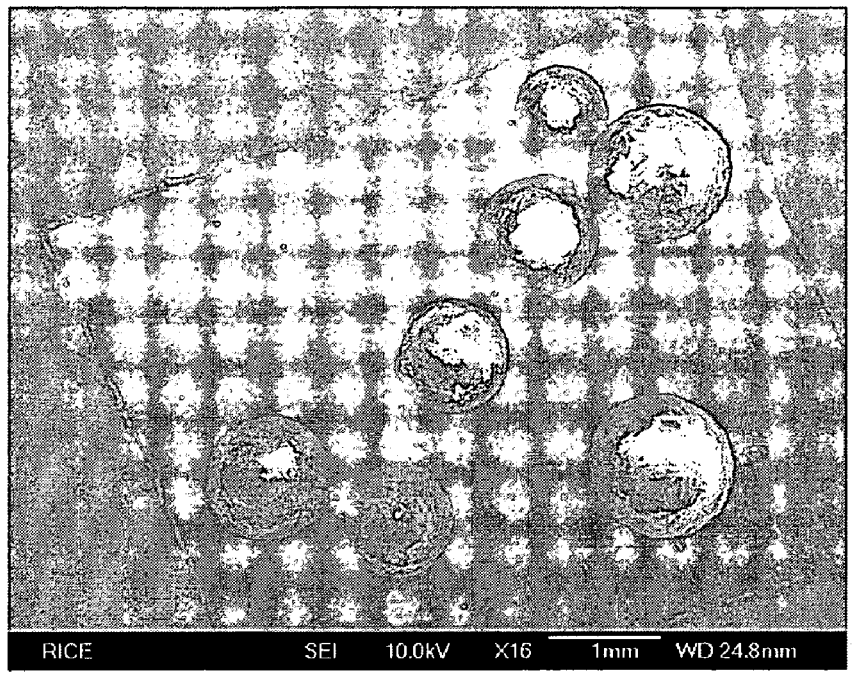
FIG. 4 is an SEM image of pre-expanded polystyrene with 1 coat of a 10% acetate-alumoxane nanoparticle solution and heated to 220° C. for 1 hour.

In Example 1, spherical polystyrene template beads were coated with the alumoxane solution, ranging from 0.5-20 weight percent alumoxane nanoparticles. The template spheres were submerged in the solution at room temperature. The solution was then drained, and the spheres placed in a ceramic crucible, which were allowed to dry under controlled conditions. The preferred conditions were at room temperature for 48 hours under 70% relative humidity. These dried, coated spheres were then agitated, and recoated two more times as stated above to achieve a uniform coating, and to maximize their sphericity. The spheres were then heated to 180° C. for 40 minutes to burn off organics and to set the alumina shell. After cooling to room temperature, the spheres were coated again with the alumoxane solution, dried, and reheated to 180° C., as stated above, which resulted in a thickening of the alumina shell. The templated alumina spheres were then sintered at 1200° C. for 1 hour, to convert the phase of alumina in the shell to the crystalline sapphire phase of alumina. FIG. 4 is a SEM image illustrating the spheres formed from the process.

This is a theoretical example. In Example 2, the polystyrene template spheres can be placed into a container under vacuum, and sufficient alumoxane solution can be injected into the container so as to submerge the template spheres. The container can be vented, followed by draining of the alumoxane solution, and drying of the spheres under controlled conditions in a ceramic crucible. The preferred conditions can be at room temperature for 48 hours under 70% relative humidity. The spheres can be recoated according to this vacuum method two more times and dried under the preferred conditions to achieve a uniform coating, and to maximize their sphericity. The alumina spheres can be heat processed at 180° C., recoated under vacuum, and dried under the preferred conditions, and sintered at 1200° C., as Example 1.

Figure 5:
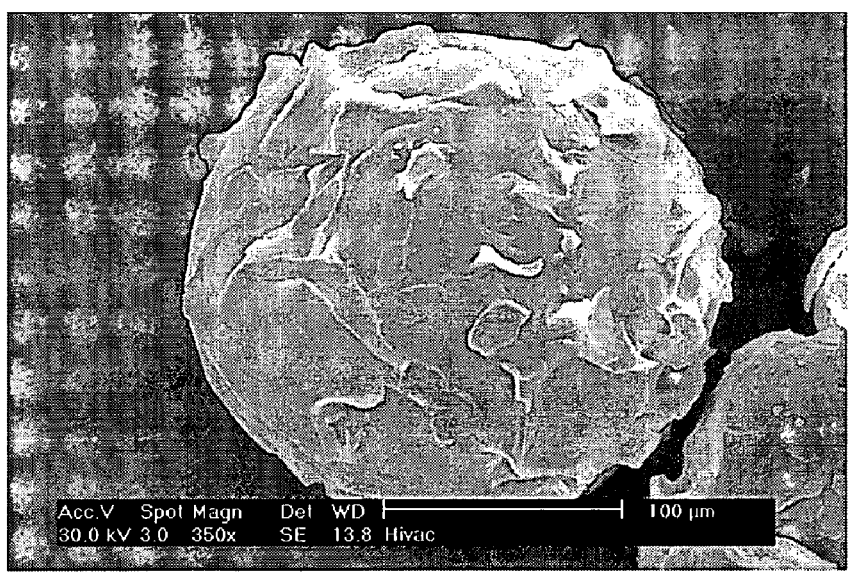
FIG. 5 is a SEM image of cenosphere with a coating of 10% acetate alumoxane nanoparticle solution heated to 1000° C. for 1 hour.

In Example 3, the Cenosphere template spheres were submerged in the alumoxane solution at room temperature. The solution was then drained, and the spheres placed in a ceramic crucible, which were allowed to dry under controlled conditions. The preferred conditions were at room temperature for 48 hours under 70% relative humidity. These dried, coated spheres were then agitated, and recoated two more times as stated above to achieve a uniform coating, and to maximize their sphericity. The spheres were then heated to 460° C. for an hour to burn off organics and to set the alumina shell. After cooling to room temperature, the spheres were coated again with the alumoxane solution, dried, and reheated to 180° C., as stated above, which results in a thickening of the alumina shell. The templated alumina spheres were then sintered at 1200° C. for 1 hour, to convert the phase of alumina in the shell to the crystalline sapphire phase of alumina. FIG. 5 is a SEM image illustrating such spheres formed from the process.

This is a theoretical example. In Example 4, the Cenosphere template spheres can be placed into a container under vacuum, and sufficient alumoxane solution can be injected into the container so as to submerge the template spheres. The container can be vented, followed by draining of the alumoxane solution, and drying of the spheres under controlled conditions in a ceramic crucible. The preferred conditions can be at room temperature for 48 hours under 70% relative humidity. The spheres can be recoated according to this vacuum method two more times and dried under the preferred conditions to achieve a uniform coating, and to maximize their sphericity. The alumina spheres can be heat processed at 460° C., recoated under vacuum, and dried under the preferred conditions, and sintered at 1200° C., as in Example 3.

This is a theoretical example. In Example 5, spherical Styropore templates of 300-1200 micron diameter range and 50-200 micron wall thickness can be infiltrated with the alumoxane solution, ranging from 0.5-60 weight percent. The resulting diameter and wall thickness of the alumina shells formed can be dictated by the diameter and wall thickness of the Styropore templates chosen. The template spheres can be submerged in the solution at room temperature. The solution can then be drained, and the spheres placed in a ceramic crucible, which can be allowed to dry under controlled conditions. The preferred conditions can be at room temperature for 48 hours under 70% relative humidity. These dried, infiltrated spheres can then be heated to at least 180° C., to calcine the infiltrated alumoxane nanoparticles to alumina, followed by further heating at a ramp rate of 0.2° C./min to 230° C. A hold of 1 hour at 230° C. can be allowed for burnoff of the Styropore template, resulting in a porous spherical alumina shell. Further heating at a ramp rate of 1° C./min to 500° C. resulted in further setting of the alumina shell. The alumina shells can then be cooled to room temperature, and themselves infiltrated with the alumoxane solution, as stated above for the Styropore templates. This can result in filling of the void space left by the lost Styropore template. These infiltrated shells can be heated at a ramp rate of 1° C./min to 500° C., to calcine the infiltrated alumoxane nanoparticles, and to further set the infiltrated alumina shell, followed by cooling to room temperature. These shells can be infiltrated and calcined once more, to produce a uniform shell of maximal sphericity, followed by sintering at 1200° C. for one hour, to convert the phase of alumina in the shell to the crystalline sapphire phase of alumina.

This is a theoretical example. In Example 6 the Styropore sphere templates can be placed into a container under vacuum, and sufficient alumoxane solution can be injected into the container so as to submerge the template spheres. The container can be vented, followed by draining of the alumoxane solution, and drying of the infiltrated Styropore spheres under controlled conditions in a ceramic crucible. The preferred conditions can be at room temperature for 48 hours under 70% relative humidity. These dried, infiltrated spheres can then be heated to at least 180° C., to calcine the infiltrated alumoxane nanoparticles to alumina, followed by further heating at a ramp rate of 0.2° C./min to 230° C. A hold of 1 hour at 230° C. can be allowed for burnoff of the Styropore template, resulting in a porous spherical alumina shell. Further heating at a ramp rate of 1° C./min to 500° C. can result in further setting of the alumina shell. The alumina shells can then be cooled to room temperature, and themselves infiltrated under the same vacuum conditions with the alumoxane solution, as stated above for the Styropore templates. This can result in filling of the void space left by the lost Styropore template. These infiltrated shells can be heated at a ramp rate of 1° C./min to 500° C., to calcine the infiltrated alumoxane nanoparticles, and to further set the infiltrated alumina shell, followed by cooling to room temperature. These shells can be infiltrated and calcined once more, to produce a uniform shell of maximal sphericity, followed by sintering at 1200° C. for one hour, to convert the phase of alumina in the shell to the crystalline sapphire phase of alumina.

This is a theoretical example. In Example 7, hollow spherical glass template beads of 150-850 micron size range can be coated with the alumoxane solution, ranging from 0.5-20 weight percent. The template spheres can be submerged in the solution at room temperature. The solution can then be drained, and the spheres placed in a ceramic crucible, which can be allowed to dry under controlled conditions. The preferred conditions can be at room temperature for 48 hours under 70% relative humidity. These dried, coated spheres can then be agitated, and recoated two more times as stated above to achieve a uniform coating, and to maximize their sphericity. The spheres can then be heated at a ramp rate of 1° C./min to 460° C., followed by a hold of 40 minutes to burn off organics and to set the alumina shell. After cooling to room temperature, the spheres can be coated again with the alumoxane solution, dried, and reheated to 460° C., as stated above, which resulted in a thickening of the alumina shell. The templated alumina spheres can then be sintered at 1200° C. for 6 hours, which resulted in the formation of an aluminosilicate at the silica-alumina interface, consisting of mullite and corundum phases. The amorphous silica further can serve as a reactive wetting phase to facilitate the resorption of some of the alumina, in creating mullite at the interface. The relative amount of mullite and alumina phases formed can be dependent on the amounts of silica and alumina initially present, and can be calculated from an alumina-silica binary phase diagram. Complete conversion of the silica phase to mullite can occur in the aluminosilicate sphere, with the alumina in excess of 60% originally present in the starting material, comprising the alumina phase of the sphere.

This is a theoretical example. In Example 8, a known amount of solid, hollow or porous beads would be fluidized in a fluid bed. An alumoxane solution would be sprayed into the chamber in order to coat the beads. The beads will then be dried by introducing a heated gas into the chamber or by virtue of their movement through the gaseous "fluid". Cycles of spraying and drying can be repeated, depending on the thickness of the coating required. Once the desired thickness has been achieved, the coated beads are removed and sintered to 1200° C. in order to convert the alumina to sapphire.

This is a theoretical example. In Example 9, a known amount of solid, hollow or porous beads would be fluidized in a fluid bed. A solution of partially cross-linked hybrid alumoxane polymer would be sprayed into the chamber in order to coat the beads. This would be followed by spraying a curing agent into the chamber in order to set the polymer coating. Alternatively, a molten hybrid alumoxane polymer could be sprayed onto the chamber to coat the particles. The beads can then be cooled by introducing cooled air into the chamber. In the case of a polymer that requires heating for cure, heated air can be introduced into the chamber.

In Example 10, 440 mL of water was mixed with 20 mL glacial acetic acid, in which 4 g of Catapal B and 36 g Dispal 11N7-80 boehmites were peptized with mixing, at room temperature for 2 hours. After sufficient mixing, 150 g of an 8% wt solution of the mixture was spray coated in a fluidized bed (Vector fluidized bed, model MFL.01) onto 20 g of cenospheres, and dried at 80° C., at 130 liters per minute airflow. These coated cenospheres were then sintered at 5° C./min to 500° C., and then to 1400° C. at 10° C./min, for 2 hours. FIGS. 6-8 illustrate sintered microstructures of the above formulation.

In Example 11, 440 mL of water was mixed with 20 mL glacial acetic acid, in which 4 g of Catapal B and 36 g Dispal 11N7-80 boehmites were peptized with mixing, at room temperature for 2 hours. To this mixture was added 50 mL of a 1% wt. $Fe_2O_3$ solution (1% $Fe_2O_3$ by total solids wt), with additional stirring. After sufficient mixing, 150 g of an 8% wt solution of the mixture was spray coated in a fluidized bed (Vector fluidized bed, model MFL.01) onto 20 g of cenospheres, and dried at 80° C., at 130 liters per minute airflow. These coated cenospheres were then sintered at 5° C./min to 500° C., and then to 1200° C. at 10° C./min, for 2 hours. FIGS. 9-11 illustrate sintered microstructures of the above formulation.

Applicants specifically incorporate the entire contents of all cited references in this disclosure. Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

What is claimed is:

1. A proppant comprising a template material having an outer surface and a shell fully encapsulating said template material, wherein said shell comprises a ceramic material or oxide thereof or a metal oxide, wherein said proppant has a crush strength and wherein the shell contributes a majority of said crush strength, and said shell is substantially uniform in thickness around the outer surface of said template material.

2. The proppant of claim 1, wherein said template material is porous.

3. The proppant of claim 1, wherein said template material is a hollow sphere.

4. The proppant of claim 1, wherein said template material is a closed foam network.

5. The proppant of claim 1, wherein said template material is a non-composite material.

6. The proppant of claim 1, wherein said template material is a single particle.

7. The proppant of claim 1, wherein said template material is a cenosphere.

8. The proppant of claim 1, wherein said template material has a crush strength of 1,000 psi or less.

9. The proppant of claim 1, wherein said template material has voids.

10. The proppant of claim 1, wherein said shell is a sintered shell.

11. The proppant of claim 1, wherein said shell comprises sintered nanoparticles.

12. The proppant of claim 1, wherein said shell has an average grain size of about 10 microns or less.

13. The proppant of claim 1, wherein said shell further comprises at least one sintering aid, glassy phase formation agent, grain growth inhibitor, ceramic strengthening agent, crystallization control agent, or phase formation control agent, or any combination thereof.

14. The proppant of claim 1, wherein said sintering aid, grain growth inhibitor, ceramic strengthening agent, crystallization control agent, or phase formation control agent comprises yttrium, zirconium, iron, magnesium, alumina, bismuth, lanthanum, silicon, calcium, cerium, silicates, borates, or oxides thereof or any combination thereof.

15. The proppant of claim 13, wherein said sintering aid, grain growth inhibitor, ceramic strengthening agent, glassy phase formation agent, crystallization control agent, or phase formation control agent is present in said shell in an amount of from about 0.1% to about 5% by weight of said shell.

16. The proppant of claim 1, wherein said template material is a hollow cenosphere.

17. The proppant of claim 1, wherein said template material comprises fly ash particles or particles derived from fly ash.

18. The proppant of claim 1, wherein said template material is a hollow spheroidal particle.

19. The proppant of claim 1, wherein said template material is precipitator fly ash.

20. The proppant of claim 1, wherein said shell is substantially non-porous.

21. The proppant of claim 1, wherein said shell is a non-reactive coating on said template material.

22. The proppant of claim 1, wherein said shell chemically bonds to said template material or a portion thereof.

23. The proppant of claim 1, wherein at least a portion of said shell diffuses, infiltrates, or impregnates a portion of said template material.

24. The proppant of claim 1, wherein at least a portion of said shell adsorbs or absorbs onto at least a portion of said template material.

25. The proppant of claim 1, wherein said shell is in direct contact with the outer surface of said template material.

26. The proppant of claim 1, wherein said proppant has a crush strength of 3,000 psi or greater.

27. The proppant of claim 1, wherein said proppant has a specific gravity of from 0.6 g/cc to about 2.5 g/cc.

28. The proppant of claim 1, wherein said shell has a wall thickness of from about 15 to about 120 microns.

29. The proppant of claim 1, wherein said proppant is spherical and has a sphericity of at least about 0.9.

30. The proppant of claim 1, wherein said shell is a spray-coated shell.

31. The proppant of claim 1, wherein said shell comprises at least one alumina, aluminosilicate, aluminate, or silicate.

32. The proppant of claim 31, wherein said aluminate or silicate or aluminosilicate is an aluminate or silicate or aluminosilicate of calcium, yttrium, magnesium, titanium, lanthanum, barium, silicon, or any combination thereof.

33. The proppant of claim 1, wherein said template material is a naturally occurring material.

34. The proppant of claim 1, wherein one or more intermediate coatings are present between said template material and said shell.

35. A method of making the proppant of claim 1, comprising coating said template material with a formulation comprising said ceramic material or oxide thereof or metal oxide to form said shell around said template and then sintering said shell.

36. The method of claim 35, wherein said sintering occurs at a sintering temperature of from about 800° C. to about 1700° C.

37. The method of claim 35, wherein said coating of said template material is achieved by spray coating.

38. The method of claim 35, wherein said shell is a non-alpha aluminum oxide that upon said sintering forms an α-aluminum oxide coating.

39. The method of claim 35, wherein said formulation is a slurry comprising said ceramic material or oxide thereof or metal oxide, along with a liquid carrier.

40. The method of claim 35, wherein said formulation is introduced into a spray coating chamber as an atomized spray and said template material is suspended in air during said coating of said template material.

41. The method of claim 35, wherein said sintering is sufficient to densify said ceramic material or oxide thereof or metal oxide and form a continuous coating.

42. The method of claim 35, wherein said formulation comprises at least one acid, surfactant, suspension aid, glassy phase formation agent, sintering aid, grain growth inhibitor, ceramic strengthening agent, crystallization control agent, or phase formation control agent, or any combination thereof.

43. The method of claim 35, wherein said ceramic material or oxide thereof or metal oxide is in the form of nanoparticles.

44. A proppant formulation comprising the proppant of claim 1, and a carrier.

45. The proppant formulation of claim 44, wherein said carrier is water or brine.

46. A method to prop open subterranean formation fractions comprising introducing the proppant formulation of claim 44 into said subterranean formation.

47. The proppant of claim 1, wherein said proppant has each of the following characteristics:
  (a) an overall diameter of from about 90 microns to about 1,600 microns;
  (b) spherical;
  (c) said shell is substantially non-porous;
  (d) said proppant has said crush strength of about 3,000 psi or greater;
  (e) said coating has a wall thickness of from about 15 to about 120 microns;
  (f) said proppant has a specific gravity of from about 0.9 to about 1.5 g/cc; and
  (g) said template material is a hollow sphere.

48. The proppant of claim 47, wherein said template material is a cenosphere.

49. The proppant of claim 47, wherein said template material is an aluminate.

50. The proppant of claim 47, wherein said template material is a sintered aluminum oxide.

51. The proppant of claim 47, wherein said template material alone has a crush strength of less than 1,000 psi.

52. The proppant of claim 47, wherein said template material is a non-composite material.

53. The proppant of claim 1, wherein said shell is an α-aluminum oxide coating.

54. The proppant of claim 1, wherein said proppant has said crush strength of from 5,000 psi to 10,000 psi.

55. The proppant of claim 1, wherein said shell comprises Mullite, Cordierite, or both.

56. The method of claim 35, wherein said shell, prior to said sintering, comprises nanoparticles as a mixture of primary particles and agglomerates.

57. The method of claim 56, wherein said primary particles have an average particle size of from about 1 nm to about 150 nm, and said agglomerates have an average particle size of from about 10 nm to about 350 nm.

58. The method of claim 35, wherein said formulation is prepared by peptizing Boehmite with at least one acid to form a sol-gel formulation comprising alumoxane.

59. The method of claim 35, wherein said formulation is a slurry comprising an alumoxane, along with a liquid carrier.

60. The proppant of claim 55, wherein said sintering aid, grain growth inhibitor, ceramic strengthening agent, glassy phase formation agent, crystallization control agent, or phase formation control agent comprises yttrium, zirconium, iron, magnesium, alumina, bismuth, silicon, lanthanum, calcium, cerium, silicates, borates, or oxides thereof or any combination thereof.

61. The proppant of claim 1, wherein said template material is a blown sphere.

62. The proppant formulation of claim 44, wherein said carrier comprises a gel, a foam, a gas, a hydrocarbon, oil, or any combination thereof.

63. The proppant of claim 1, wherein said shell has an average grain size of 1 micron or less.

64. The proppant of claim 1, wherein said shell has an average grain size of 0.1 micron to 0.5 micron.

65. The proppant of claim 64, wherein said shell has a maximum grain size of 1 micron.

66. The proppant of claim 63, wherein at least 90% of all grain sizes are within the range of from 0.1 to 0.6 micron.

67. The proppant of claim 1, wherein said proppant has a specific gravity of from 0.9 g/cc to about 1.5 g/cc.

68. The proppant of claim 1, wherein said proppant has a specific gravity of from 1.0 g/cc to about 1.3 g/cc.

69. The proppant in claim 1, wherein said shell comprises one or more crystalline phases or one or more glassy phases, or combinations thereof.

70. The proppant of claim 1, wherein said template material is a synthetic ceramic microsphere.

71. The proppant of claim 70, wherein said template is formed from a blowing process.

72. The proppant of claim 70, wherein said template is formed from a drop tower process.

73. A method of treating a subterranean producing zone penetrated by a well bore comprising the steps of: (a) preparing or providing a treating fluid that comprises a hydrocarbon or water carrier fluid having the proppant of claim 1 suspended therein, and (b) pumping said treating fluid into said subterranean producing zone whereby said particles are deposited therein.

74. The method of claim 73, wherein said treating fluid is a fracturing fluid and said particles are deposited in fractures formed in said subterranean producing zone.

75. The method of claim 73, wherein said treating fluid is a gravel packing fluid and said particles are deposited in said well bore adjacent to said subterranean producing zone.

* * * * *